(12) United States Patent
Pan et al.

(10) Patent No.: US 12,004,094 B2
(45) Date of Patent: Jun. 4, 2024

(54) METHODS AND APPARATUS FOR NEW RADIO INITIAL SYNCHRONIZATION AND PAGING

(71) Applicant: INTERDIGITAL PATENT HOLDINGS, INC., Wilmington, DE (US)

(72) Inventors: Kyle Jung-Lin Pan, Saint James, NY (US); Chunxuan Ye, San Diego, CA (US); Robert L. Olesen, Huntington, NY (US); Fengjun Xi, San Diego, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/337,582

(22) PCT Filed: Sep. 28, 2017

(86) PCT No.: PCT/US2017/054057
§ 371 (c)(1),
(2) Date: Mar. 28, 2019

(87) PCT Pub. No.: WO2018/064358
PCT Pub. Date: Apr. 5, 2018

(65) Prior Publication Data
US 2020/0037274 A1 Jan. 30, 2020

Related U.S. Application Data

(60) Provisional application No. 62/416,509, filed on Nov. 2, 2016, provisional application No. 62/400,982, filed on Sep. 28, 2016.

(51) Int. Cl.
*H04W 56/00* (2009.01)
*H04B 7/06* (2006.01)
(Continued)

(52) U.S. Cl.
CPC ........ *H04W 56/001* (2013.01); *H04B 7/0617* (2013.01); *H04B 7/0623* (2013.01);
(Continued)

(58) Field of Classification Search
CPC .. H04B 7/0695; H04B 7/0617; H04B 7/0623; H04W 56/001; H04W 16/28; H04W 72/046; H04W 68/005
See application file for complete search history.

(56) References Cited

U.S. PATENT DOCUMENTS 9,866,299 B2   1/2018  Guey et al.
10,284,320 B2  5/2019  Frenne et al.
(Continued)

FOREIGN PATENT DOCUMENTS

EP   2 938 008 B1    6/2017
IN   201641021194  *  6/2016

OTHER PUBLICATIONS

Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah/D10.0 (Sep. 2016).
(Continued)

*Primary Examiner* — Ricardo H Castaneyra
(74) *Attorney, Agent, or Firm* — Volpe Koenig

(57) ABSTRACT

An apparatus and method for synchronization between a WTRU and a gNB are disclosed. The WTRU may receive a multiple beam synchronization signal from the gNB during synchronization. For each beam received by the WTRU, of the multiple beam synchronization signal, the WTRU may compare a received energy of the beam against a first threshold. A multiple beam synchronization signal may
(Continued)

include a first and second synchronization signal (SS). If one or more beams of the multiple beam synchronization signal meets or exceeds the first threshold, the WTRU may report an indication of pre-synchronization to the gNB. This pre-synchronization may indicate to the gNB that a WTRU exists in an area of a particular beam of the WTRU. In this way, a gNB may target the WTRU using transmissions directed towards the WTRU.

17 Claims, 22 Drawing Sheets

(51) Int. Cl.
  H04W 16/28 (2009.01)
  H04W 68/00 (2009.01)
  H04W 72/044 (2023.01)
(52) U.S. Cl.
  CPC ......... H04W 16/28 (2013.01); H04W 68/005 (2013.01); H04W 72/046 (2013.01)

(56) References Cited

U.S. PATENT DOCUMENTS

| 2006/0033013 | A1 | 2/2006 | Pustelniak | |
| 2013/0121185 | A1 | 5/2013 | Li et al. | |
| 2013/0258885 | A1 | 10/2013 | Yu et al. | |
| 2015/0078300 | A1* | 3/2015 | Xu | H04W 74/08 370/329 |
| 2016/0212631 | A1 | 7/2016 | Shen et al. | |
| 2016/0337056 | A1* | 11/2016 | Frenne | H04B 7/0413 |
| 2017/0127367 | A1* | 5/2017 | Axnas | H04W 72/0446 |
| 2017/0325260 | A1* | 11/2017 | Guo | H04L 27/265 |
| 2017/0353255 | A1* | 12/2017 | Islam | H04B 7/2615 |
| 2017/0367069 | A1* | 12/2017 | Agiwal | H04W 68/005 |
| 2019/0182782 | A1* | 6/2019 | Wang | H04W 56/0015 |
| 2019/0229789 | A1* | 7/2019 | Zhang | H04B 7/0617 |
| 2019/0297560 | A1* | 9/2019 | Gao | H04W 48/08 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 8: Medium Access Control (MAC) Quality of Service Enhancements, IEEE Std. 802.11e-2005 (Nov. 2005).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 7: Extensions to Direct-Link Setup (DSL), IEEE 802.11z-2010 (Oct. 14, 2010).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std. 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE P802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
Interdigital Communications et al., "Considerations for DL Broadcast Channel for Initial Access in NR," 3GPP TSG RAN WG1 Meeting #87, R1-1612628, Reno, USA (Nov. 14-18, 2016).
Interdigital Communications, "On Broadcast Channel Transmission," 3GPP TSG RAN WG1 Meeting #88, R1-1702318, Athens, Greece (Feb. 13-17, 2017).
International Telecommunciation Union, "IMT Vision—Framework and overall objectives of the future development of IMT for 2020 and beyond; M Series Mobile, radiodetermination, amateur and related satellite services," Recommendation ITU-R M.2083-0 (Sep. 2015).
Third Generation Partnership Project, "Technical Specification Group Radio Access Network; Study on Scenarios and Requirements for Next Generation Access Technologies; (Release 14)," 3GPP TR 38.913 V0.3.0 (Mar. 2016).
Third Generation Partnership Project, "Technical Specification Group Radio Access Network; Study on Scenarios and Requirements for Next Generation Access Technologies; (Release 14)," 3GPP TR 38.913 V0.4.0 (Jun. 2016).
Third Generation Partnership Project, "Technical Specification Group Radio Access Network; Study on Scenarios and Requirements for Next Generation Access Technologies; (Release 14)," 3GPP TR 38.913 V14.3.0 (Jun. 2017).
Third Generation Partnership Project, "Technical Specification Group Radio Access Network; Requirements for further advancements for Evolved Universal Terrestrial Radio Access (E-UTRA) (LTE-Advanced) (Release 14)," 3GPP TR 36.913 V14.0.0 (Mar. 2017).
Third Generation Partnership Project, "Technical Specification Group Radio Access Network; Requirements for further advancements for Evolved Universal Terrestrial Radio Access (E-UTRA) (LTE-Advanced) (Release 13)," 3GPP TR 36.913 V13.0.0 (Dec. 2015).
Interdigital, "Random access aspects for beam-based NR initial access," 3GPP TSG RAN WG1 Meeting #86, R1-167333, Gothenburg, Swededn (Aug. 22-26, 2016).
LG Electronics, "Discussion on DL Synchronization in NR," 3GPP TSG RAN WG1 Meeting #86, R1-166910, Gothenburg, Sweden (Aug. 22-26, 2016).
Third Generation Partnership Project, Technical Specification Group Radio Access Network; Evolved Universal Terrestrial Radio Access (E-UTRA) and Evolved Universal Terrestrial Radio Access Network (E-UTRAN); Overall description; Stage 2 (Release 13)3GPP TS 36.300 V13.4.0 (Jun. 2016).
Third Generation Partnership Project, "Technical Specification Group Radio Access Network; Evolved Universal Terrestrial Radio Access (E-UTRA) and Evolved Universal Terrestrial Radio Access Network (EUTRAN); Overall description; Stage 2 (Release 13)," 3GPP TS 36.300 V13.9.0 (Sep. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.4.0 (Sep. 2017).
Third Generation Partnership Project, "Technical Specification Group Radio Access Network; Evolved Universal Terrestrial Radio Access

(56) References Cited

OTHER PUBLICATIONS (E-UTRA); Radio Resource Control (RRC); Protocol specification (Release 13)," 3GPP TS 36.331 V13.2.0 (Jun. 2016).
Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.7.0 (Sep. 2017).
Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.4.0 (Sep. 2017).
Third Generation Partnership Project, "Technical Specification Group Radio Access Network; NR; NR and NG-RAN Overall Description; Stage 2 (Release 15)," 3GPP TS 38.300 V1.0.0 (Sep. 2017).
Third Generation Partnership Project, "Technical Specification Group Radio Access Network; NR; Radio Resource Control (RRC); Protocol specification (Release 15)," 3GPP TS 38.331 V0.0.5 (Aug. 2017).
Third Generation Partnership Project, "Technical Specification Group Radio Access Network; NR; Physical layer procedures for control (Release 15)," 3GPP TS 38.213 V1.0.0 (Sep. 2017).
Third Generation Partnership Project, "Technical Specification Group Radio Access Network; NR; Medium Access Control (MAC) protocol specification (Release 15)," 3GPP TS 38.321 V1.0.0 (Sep. 2017).
Third Generation Partnership Project, "Technical Specification Group Radio Access Network; New Generation Radio Access Network; User Equipment (UE) procedures in Idle mode (Release 15)," 3GPP TS 38.304 v0.0.4 (Aug. 2017).
Third Generation Partnership Project, "Technical Specification Group Radio Access Network; Evolved Universal Terrestrial Radio Access (E-UTRA); Physical layer procedures (Release 13)," 3GPP TS 36.213 V13.2.0 (Jun. 2016).
Third Generation Partnership Project, "Technical Specification Group Radio Access Network; Evolved Universal Terrestrial Radio Access (E-UTRA); Physical layer procedures (Release 13)," 3GPP TS 36.213 V13.7.0 (Sep. 2017).
Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).
Third Generation Partnership Project, "Technical Specification Group Radio Access Network; Evolved Universal Terrestrial Radio Access (E-UTRA); User Equipment (UE) procedures in idle mode (Release 14)," 3GPP TS 36.304 V14.4.0 (Sep. 2017).
Third Generation Partnership Project, "Technical Specification Group Radio Access Network; Evolved Universal Terrestrial Radio Access (E-UTRA); User Equipment (UE) procedures in idle mode (Release 13)," 3GPP TS 36.304 V13.7.0 (Sep. 2017).
Third Generation Partnership Project, "Technical Specification Group Radio Access Network; Evolved Universal Terrestrial Radio Access (E-UTRA); User Equipment (UE) procedures in idle mode (Release 13)," 3GPP TS 36.304 V13.2.0 (Jun. 2016).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.2.0 (Jun. 2016).
Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.7.0 (Sep. 2017).
Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.4.0 (Sep. 2017).

* cited by examiner

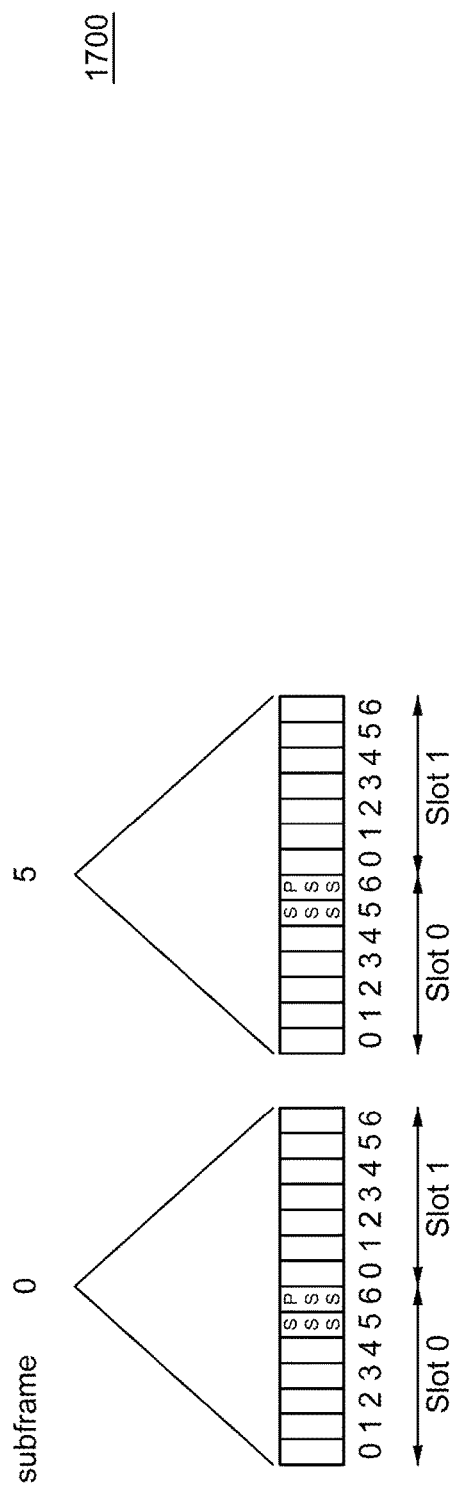
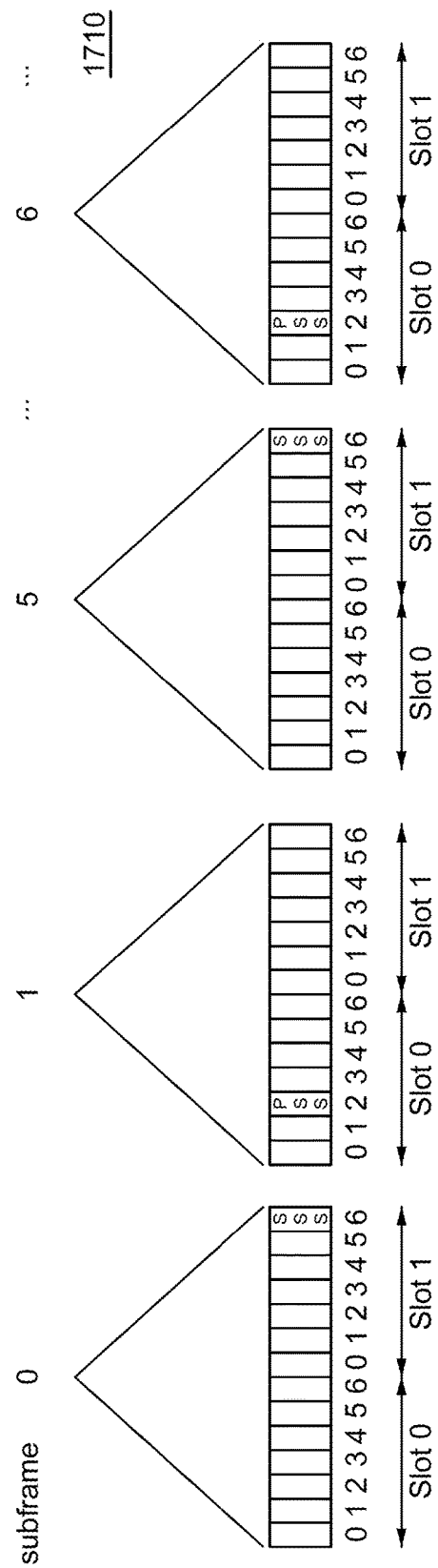
FIG. 17A
FIG. 17B

FIG. 21

METHODS AND APPARATUS FOR NEW RADIO INITIAL SYNCHRONIZATION AND PAGING

CROSS REFERENCE TO RELATED APPLICATIONS

This application is the U.S. National Stage, under 35 U.S.C. § 371, of International Application No. PCT/US2017/054057 filed Sep. 28, 2017, which claims the benefit of U.S. Provisional Application No. 62/416,509 filed on Nov. 2, 2016 and U.S. Provisional Application No. 62/400,982 filed on Sep. 28, 2016 the contents of which are hereby incorporated by reference herein.

BACKGROUND

A wireless transmit/receive unit (WTRU) may acquire time and frequency synchronization with a cell and detect the Cell ID of the cell using a cell search procedure. For Long Term Evolution (LTE), for example, synchronization signals may be transmitted in the 0th and 5th subframes of every radio frame and may be used for time and frequency synchronization during initialization. As part of the system acquisition process, a WTRU may synchronize sequentially to the orthogonal frequency-division multiplexing (OFDM) symbol, slot, subframe, half-frame and radio frame based on the synchronization signals.

The synchronization signals may include the primary synchronization signal (PSS), which may be used to obtain the slot, subframe and half-frame boundary, and the secondary synchronization signal (SSS), which may be used to obtain the radio frame boundary. In addition, the SSS may provide the physical layer cell identity (PCI) within the cell identity group, and the PSS may enable the WTRU to determine the cell identity group (e.g., ranging from 0-167). Following a successful synchronization and PCI acquisition, the WTRU may decode the physical broadcast channel (PBCH) using a cell specific reference signal (CRS) to acquire master information block (MIB) information regarding system bandwidth, system frame number (SFN) and physical hybrid-automatic repeat request (ARQ) indicator channel (PHICH) configuration. In LTE, the synchronization signals and the PBCH are transmitted continuously according to the standardized periodicity.

A potential timing ambiguity may exist in systems which employ legacy synchronization signals of LTE and/or NR systems with multi-beam synchronization and/or paging. Support for a multi-beam design in NR may lead to a problem with cell ID, beam ID, and subframe/frame boundary detection for multi-beam that does not exist in LTE.

SUMMARY

Methods and apparatus for new radio (NR) initial synchronization are described. A wireless transmit/receive unit (WTRU) includes a processor, a transmitter and a receiver. The processor and receiver detect at least one downlink synchronization signal in a particular synchronization beam in a particular synchronization beam direction. The particular synchronization beam is one of a plurality of synchronization beams swept in a plurality of synchronization beam directions. The processor and the transmitter send an acknowledgement signal for the particular synchronization beam in the particular synchronization beam direction on a condition that the downlink synchronization signal is above at least one threshold. The processor and receiver receive, in response to the acknowledgement signal, one of an enhanced synchronization signal and a physical broadcast channel (PBCH).

An apparatus and method for synchronization between a wireless transmit/receive unit (WTRU) and a next generation Node B (gNB) are disclosed. The WTRU may receive a multiple beam synchronization signal from the gNB during synchronization. For each beam received by the WTRU, of the multiple beam synchronization signal, the WTRU may compare a received energy of the beam against a first threshold. A multiple beam synchronization signal may include a first and second synchronization signal (SS). If one or more of the beams of the multiple beam synchronization signal meets or exceeds the first threshold, the WTRU may report an indication of pre-synchronization to the gNB. This pre-synchronization may indicate to the gNB that a WTRU exists in an area of a particular beam of the WTRU. In this way, a gNB may target the WTRU using transmissions directed towards the WTRU.

In an embodiment, the WTRU may determine, from the multiple beam synchronization signal, control information of the gNB. The WTRU may compare an accumulated received energy of remaining beams of the multiple beams against a second threshold. Upon completion of synchronization, the WTRU may transmit a post-synchronization report to the gNB.

BRIEF DESCRIPTION OF THE DRAWINGS

A more detailed understanding may be had from the following description, given by way of example in conjunction with the accompanying drawings wherein:

FIG. 17A is an illustration of frequency division duplex (FDD) sub-frame timing;

FIG. 17B is an illustration of time domain duplex (TDD) sub-frame timing;

FIG. 21 is a diagram of an example synchronous SYNC/PBCH design for single and multi-beam operations;

DETAILED DESCRIPTION

Figure 1A:
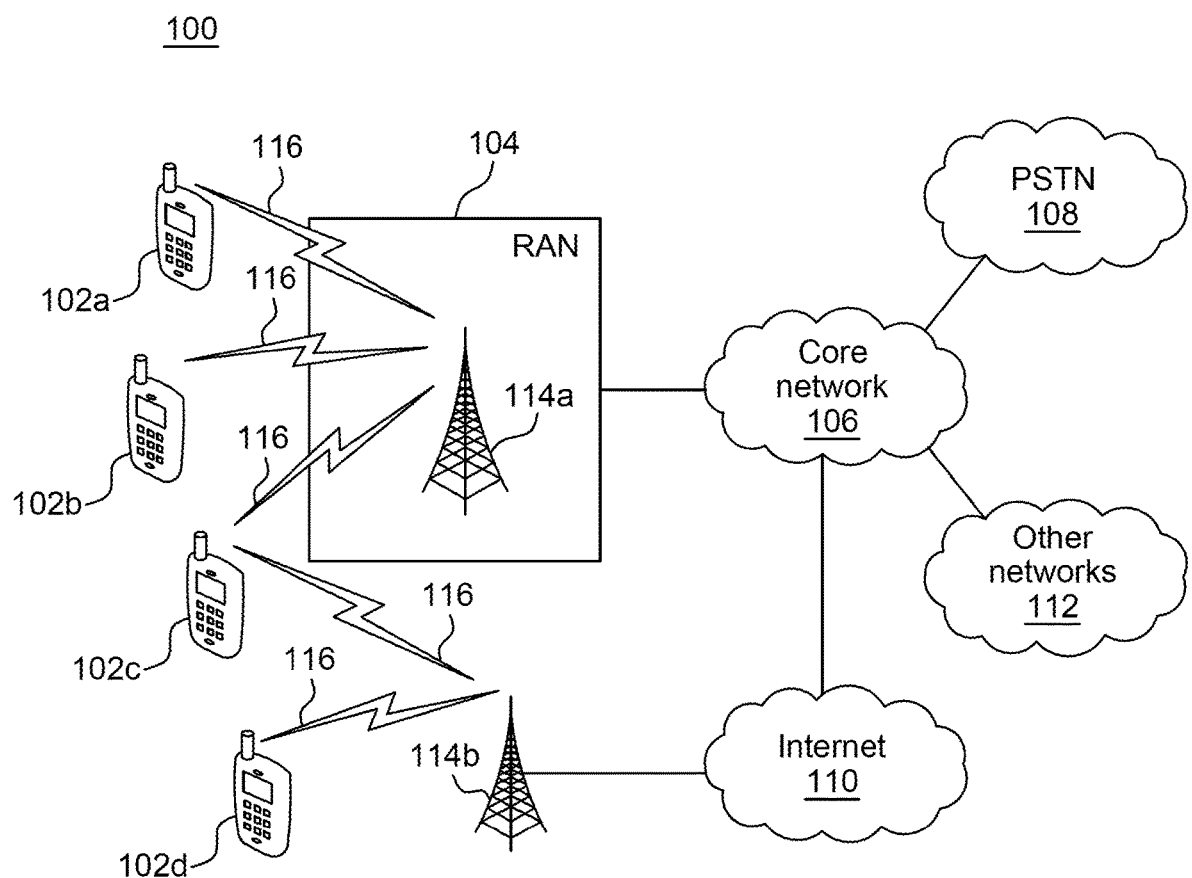
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
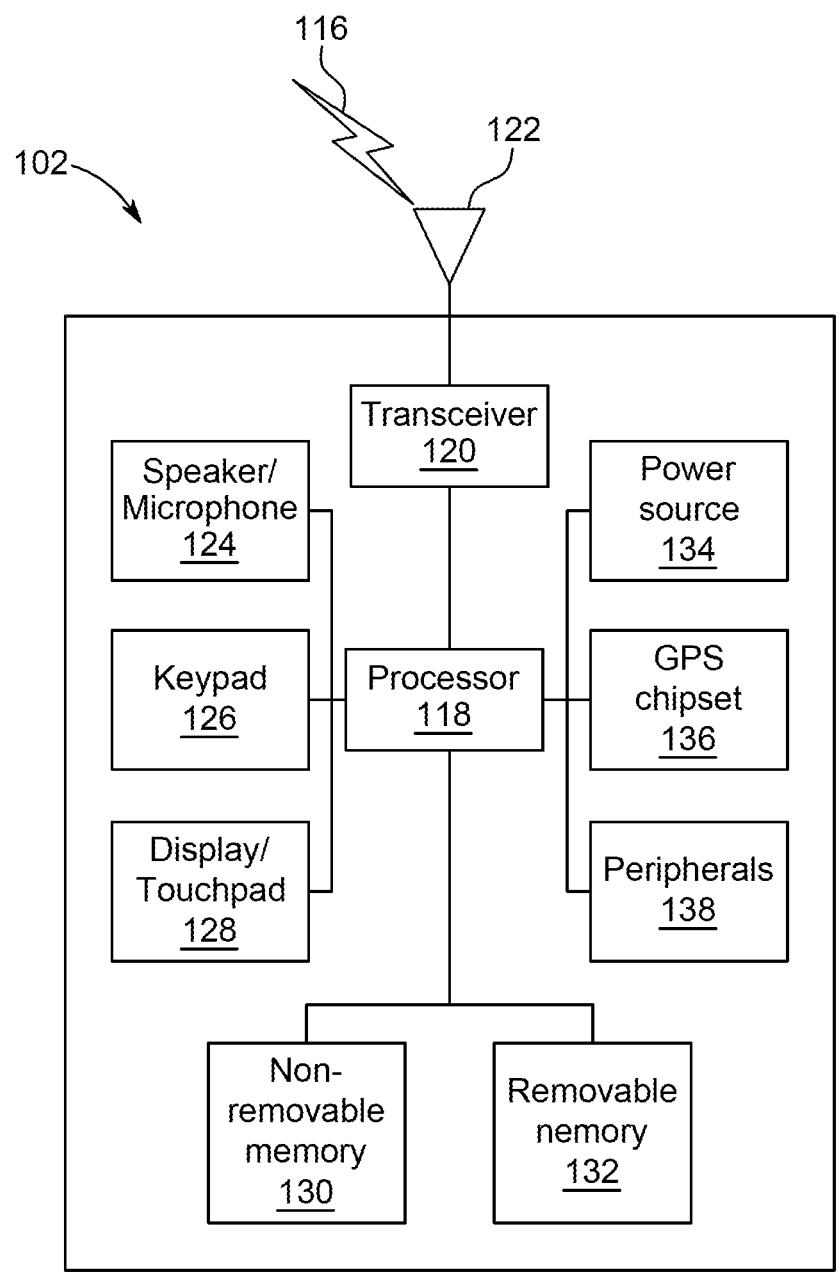
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
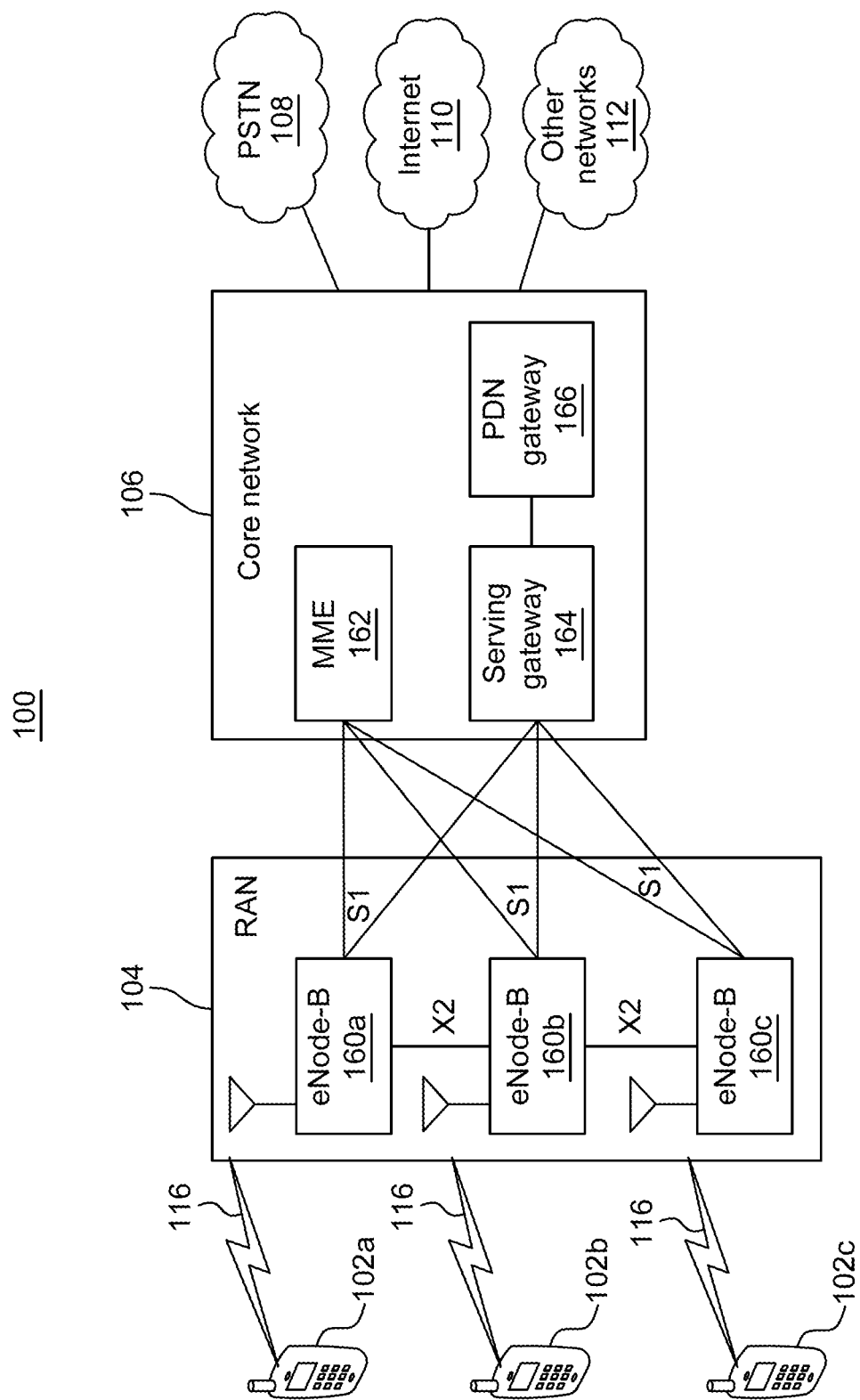
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
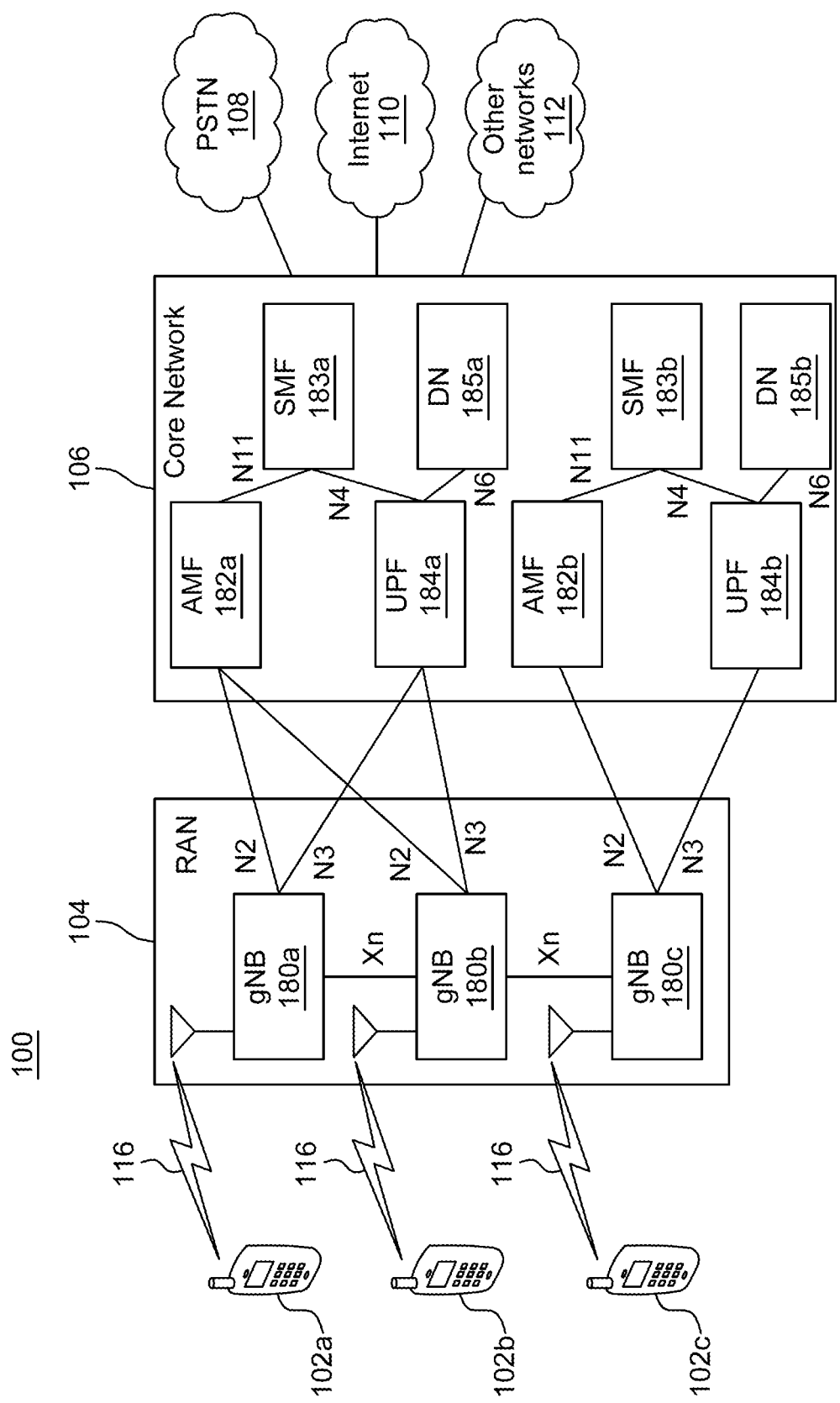
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Emerging 5G systems, such as enhanced mobile broadband (eMBB), massive machine type communications (MTC) and ultra reliable and low latency communications (URLLC), may have various requirements, including, for example, increased data rate, increased spectrum efficiency, low power and increased energy efficiency, and reduced latency and reliability. A wide range of spectrum bands ranging from 700 MHz to 80 GHz are being considered for a variety of potential deployment scenarios. As carrier frequency increases, severe path loss becomes a crucial limitation to guaranteeing a sufficient coverage area. Transmission in millimeter wave systems could additionally suffer from non-line-of-sight losses, for example, diffraction loss, penetration loss, oxygen absorption loss and foliage loss.

During initial access, a base station, such as a next generation Node B (gNB), and a WTRU may need to overcome these high path losses and discover each other. One way to compensate for the severe path loss may be to use many, for example, dozens or even hundreds of antenna elements to generate a beamformed signal and provide significant beamforming gain. Beamforming techniques may include, for example, digital, analog and hybrid beamforming. Embodiments described herein may provide for methods and apparatus for new radio (NR) initial synchronization that may provide for beam sweeping that covers the service area with low overhead and may also provide for efficient detection of cell ID and/or beam ID. The gNB and WTRU may also need to overcome high path losses in other scenarios, including paging. Methods and systems disclosed herein may also apply to paging.

Figure 2:
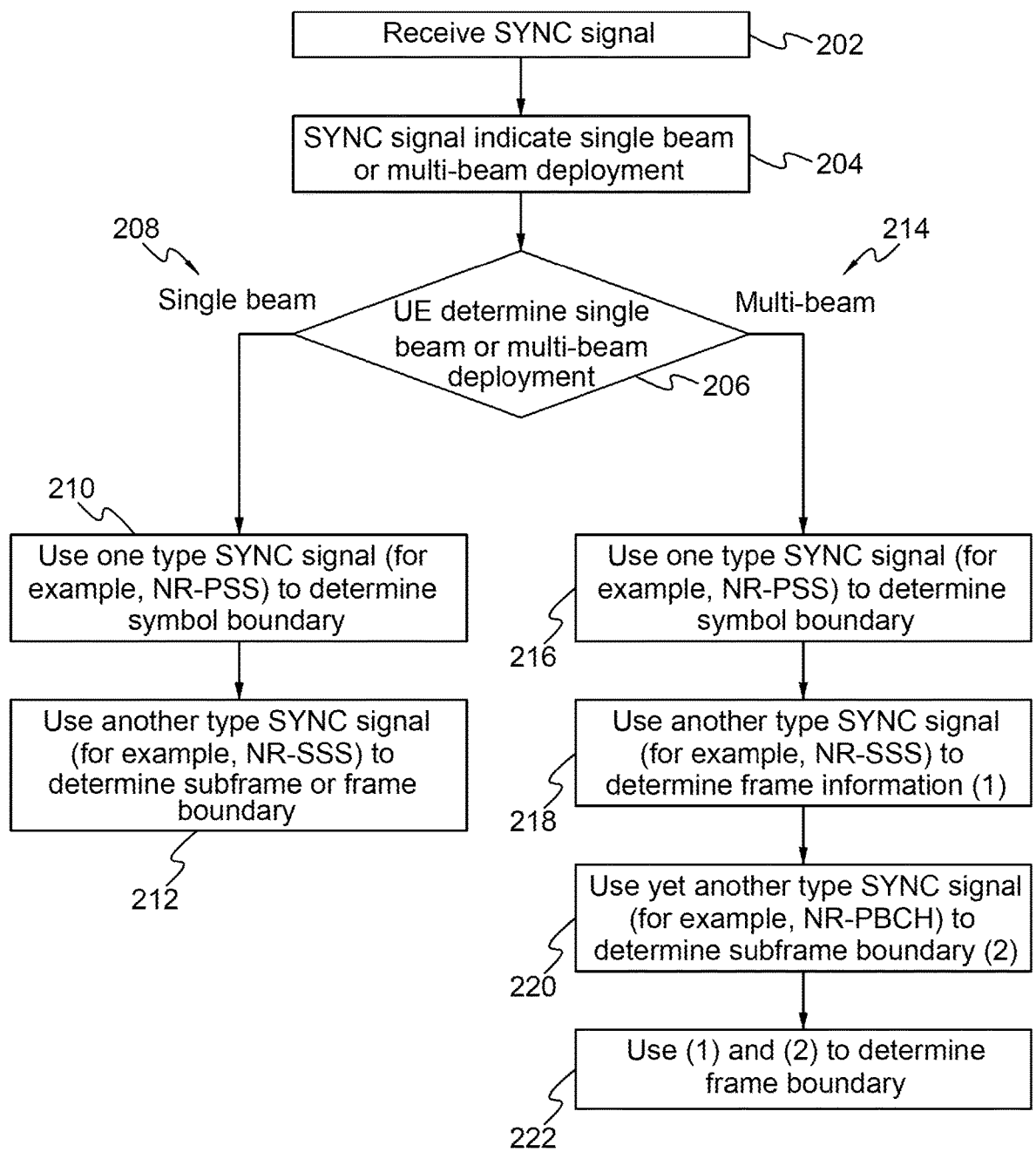
FIG. 2 is a flow diagram of an example unified initial synchronization method.

FIG. 2 is a flow diagram 200 of an example unified initial synchronization method. In the example illustrated in FIG. 2, a WTRU receives a SYNC signal 202. The SYNC signal may be, for example, a NR Primary Synchronization Signal (NR-PSS), a NR Secondary Synchronization Signal (NR-SSS) or a NR Physical Broadcast Channel (NR-PBCH) signal. One type of synchronization (SYNC) signal may indicate 204 single beam or multi-beam deployment, and a WTRU receiving the SYNC signal may determine 206 single beam or multi-beam deployment based on the detected SYNC signal.

Depending on whether the WTRU determines 206 that single beam or multi-beam deployment is indicated, the WTRU may determine the subframe and frame boundary. For example, on a condition that a single beam is indicated 208, the WTRU may use one type of SYNC signal 210, for example NR-PSS, to determine a symbol boundary and may use another type of SYNC signal 212, for example NR-SSS, to determine a subframe or frame boundary. On a condition that multi-beam is indicated 214, the WTRU may use one type of SYNC signal 216, for example, NR-PSS to determine the symbol boundary. The WTRU may use another type of SYNC signal 218, for example NR-SSS, to determine frame information, which may carry some information with respect to the frame, for example, a frame indication, frame front or frame rear. The WTRU may use yet another type of SYNC signal 220, for example NR-PBCH, to determine the sub-frame boundary. The WTRU may use the determined frame information together with the determined subframe boundary to determine 222 the frame boundary.

Figure 3A:
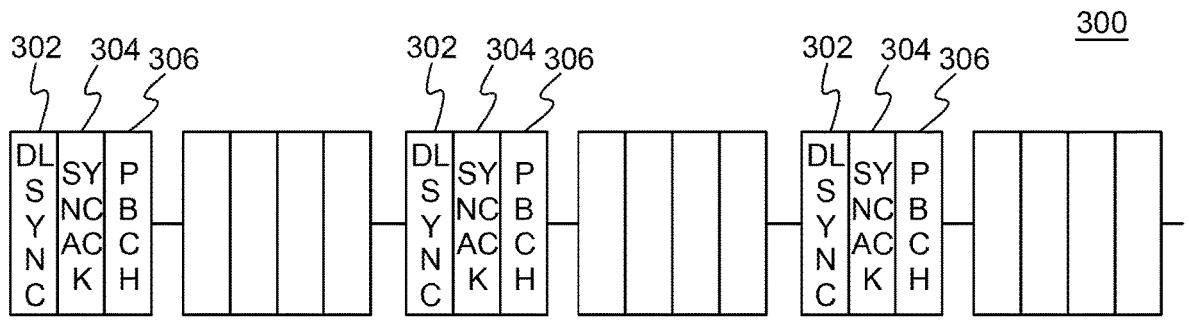
FIG. 3A is a diagram of an example energy-based acknowledgement (ACK)-to-synchronization (SYNC) scheme.
Figure 3B:
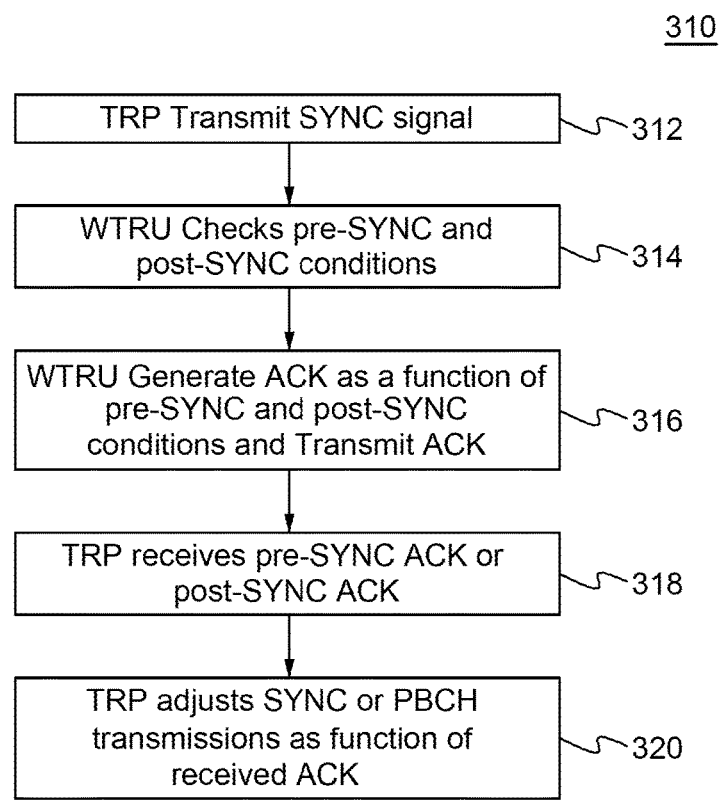
FIG. 3B is a flow diagram of an example initial synchronization method.

FIG. 3A is a diagram 300 of an example energy-based ACK-to-synchronization (SYNC) scheme. FIG. 3B is a flow diagram 310 of an example initial synchronization method. As illustrated in FIGS. 3A and 3B, a gNB may transmit a SYNC signal in different directions using a beam sweep procedure. When a WTRU detects a SYNC signal for a particular beam, the WTRU may send back an ACK to respond to that beam. The gNB may receive the ACK and learn the beam location profile of the WTRU that sent the ACK. Each WTRU may send an ACK as long as a SYNC signal is detected in a beam.

An energy-based ACK scheme may be used such that, when a WTRU detects a SYNC signal having an energy level that is above a predetermined threshold for a particular beam, an ACK may be reported with respect to that beam. The gNB may maintain a list of beams that have been acknowledged. When the gNB transmits the next PBCH, the gNB may perform the beam sweep only using those beams that have been acknowledged because the acknowledged beams may imply that WTRUs for which the gNB is in communication with reside within those beams. For example, FIG. 3A illustrates a DL SYNC 302 multibeam transmission by a TRP or gNB, immediately followed by a SYNC ACK 304 transmission to the TRP or gNB in response. A PBCH 306 may be received thereafter. This procedure may be repeated as a WTRU moves about.

A WTRU may use one or more different schemes to detect and acknowledge the SYNC signal in a particular beam. For example, beams may be acknowledged if the WTRU detects energy that is above a predetermined energy threshold for one or more of the particular beams. This may imply that there are potential WTRUs in the beams that have not yet fully synchronized with a transmission reception point (TRP) or gNB. In another example, beams may be acknowledged if the WTRU detects the SYNC signal and completes initial synchronization. This may imply that there are definitely WTRUs in the beams that have synchronized with the TRP or gNB.

The first example described above may be used, for example, for SYNC beam sweeping and may provide an early-beam-location profile of WTRUs. Although this method may or may not be 100% accurate, it may still be used for SYNC transmission only being performed for the acknowledged beams. By adjusting the energy threshold to be optimal, better accuracy may be achieved. A trade-off between a false alarm rate for beams and detection probability of beams may be taken into consideration. One strategy may be to lower the energy threshold to allow higher detection probability for beams at the cost of a higher false alarm rate. The higher false alarm rate may increase the power consumption since more beams may be added to the beam list and more beams may be swept during the next beam sweeping.

The method described in the second example above may be used, for example, to implement beam sweep for SYNC and achieve moderate energy efficiency for SYNC transmission. This example method may be used for a physical broadcast channel (PBCH) beam sweep and may provide the exact beam-location profile of WTRUs in the cell. Therefore, this exemplary method may be used to implement SYNC-assisted beamformed DL transmission for PBCH and achieve the most energy efficiency for PBCH transmission. A SYNC-ACK signal may be placed between the DL SYNC signal and the PBCH signal, as illustrated in FIG. 3A. As shown in FIG. 3B, a TRP or gNB may transmit 312 a SYNC signal. A receiving WTRU may check 314 pre-SYNC and post-SYNC conditions, then generate and transmit 316 an ACK as a function of the pre-SYNC and post-SYNC conditions. When the TWO received a pre-SYNC or post-SYNC ACK 318 the TRP may adjust 320 SYNC or PBCH transmissions as a function of the received ACK.

Due to WTRU mobility, the beam-location profile may be changed. Therefore, the beam-location profile may need to be continually updated. For example, the gNB or TRP may perform a full beam sweep every N TTIs. In-between two cycles of a full beam sweep, a SYNC-assisted beamformed DL transmission may be used. A SYNC may be a paging indication. A SYNC-assisted beamformed DL transmission may be a paging indication-assisted beamformed DL transmission. A full beam sweep may be used to reset and update the complete beam-location profile and to ensure that the targeted WTRUs receive the SYNC signal in all beams of all directions. A full beam sweep may also be used to receive the paging indication. If a WTRU does not receive the SYNC signal in a particular beam, the WTRU may either wait until the next full beam sweep to receive the SYNC signal again or initiate a UL SYNC signal request to a DL SYNC signal for a preset timer.

Figure 4:
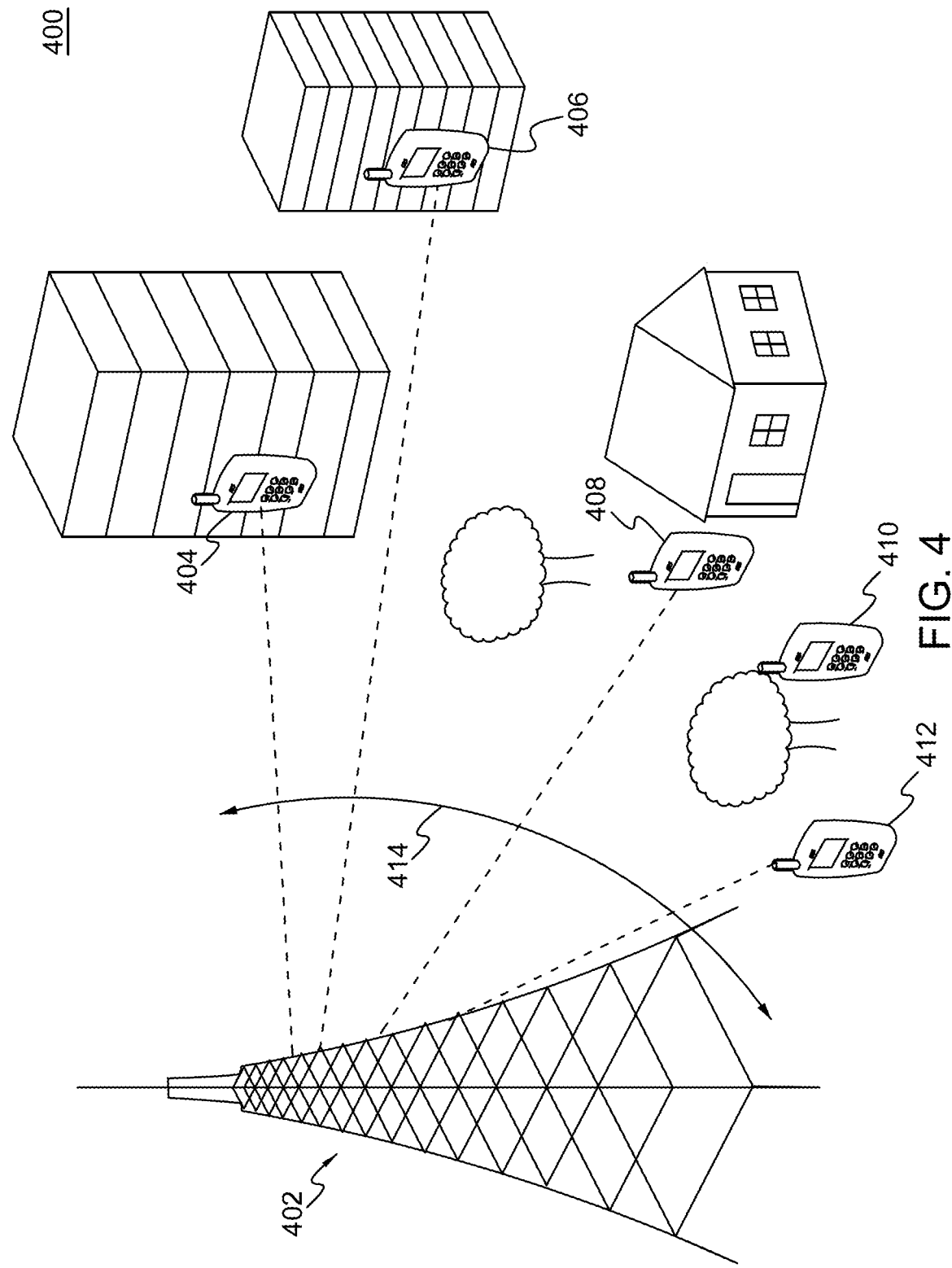
FIG. 4 is an illustration of a beamforming or spatial filtering procedure by a gNB.

FIG. 4 illustrates a beamforming or spatial filtering procedure 400 by a gNB 402. The gNB 402 may be comprised of a plurality of antenna elements, for example, 10, 100, or 1000 antennas. The gNB 402 may be configured to execute signal processing algorithms to determine a preferred beam for a particular WTRU. For example, WTRUs 404-406 may be located within buildings. Another WTRU 408 may be located on or near a home or other building. Another WTRU 410 may be located behind an object such as a tree, barn or other object or structure. Another WTRU 412 may be mobile and fast moving. Each of these WTRUs may beed to be discovered via beamforming. The signal processing algorithms may determine an appropriate beam for transmitting data to/from by data sweeping 414, for example, sending data packets in many different directions and receiving feedback from one or more of the WTRUs. This may allow the potentially massive antenna array to be configured to direct transmissions according to position. Additionally, by tracking movement of a WTRU, these directed transmissions may be schedule to occur in advance of movement of the WTRU in accordance with an expected or anticipated arrival time of a beam/WTRU.

Figure 5:
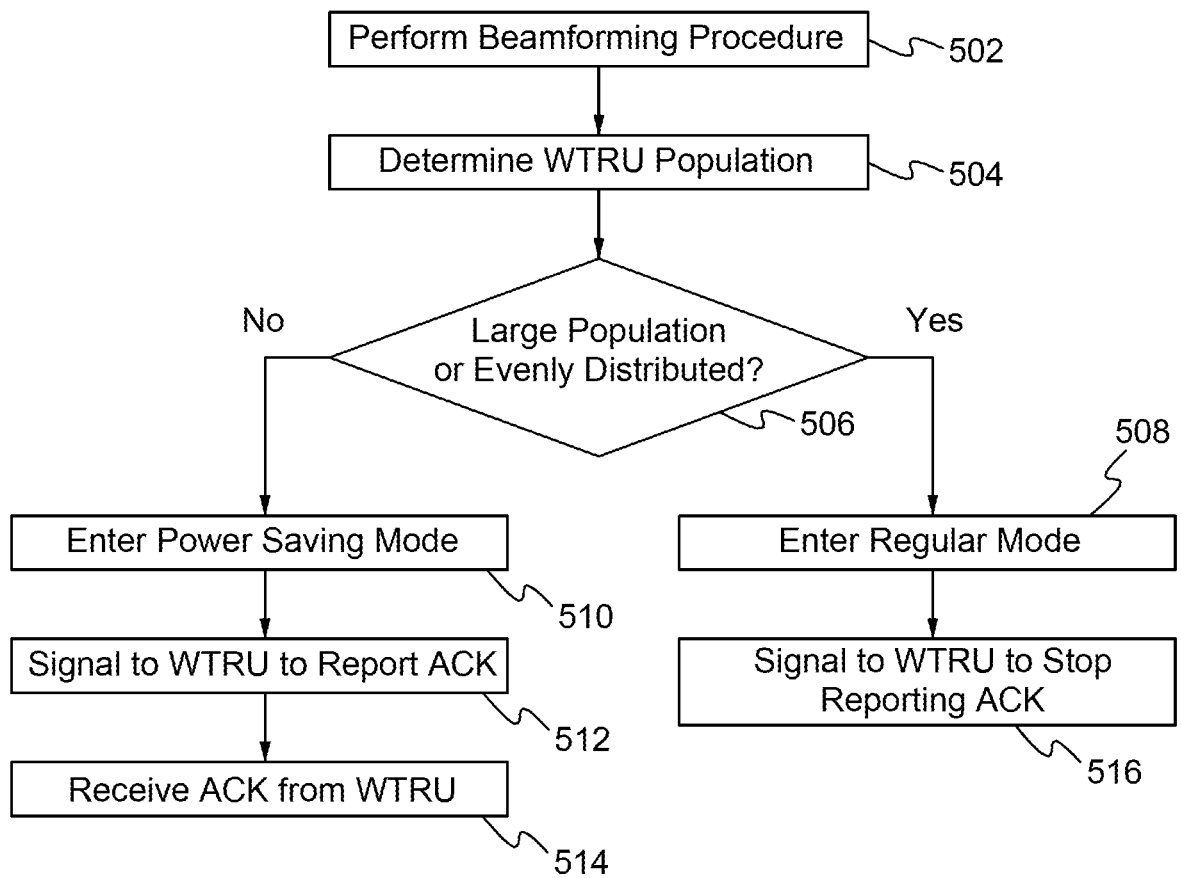
FIG. 5 is a diagram of example multiple beam based SYNC and physical broadcast channel (PBCH) signals.

FIG. 5 illustrates a power saving mode determination procedure 500. In embodiments, a SYNC-assisted beamformed DL transmission may be used for energy conservation. An energy efficiency mode using SYNC-assisted beamformed DL transmission and a regular mode using full beam sweep may be used. Depending on the WTRU population, the gNB may switch between energy saving mode and regular mode for PBCH transmission. A beamforming procedure 502 may be performed and WTRU population determined 504. When the WTRU population becomes large and uniformly distributed 506, the gNB may switch to the regular mode 508 for PBCH transmission. When the WTRU population becomes small, the gNB may switch to the power saving mode 510 for PBCH transmission. When the WTRU population becomes large and concentrates in certain beams or directions, the gNB may switch to the power saving mode 510 for PBCH transmission. When the gNB switches to the power saving mode, it may signal the WTRU to report the ACK again 512 and an ACK may be received 514. When the gNB switches to the regular mode 508, the gNB may signal the WTRU to stop reporting ACKs 516.

Figure 6:
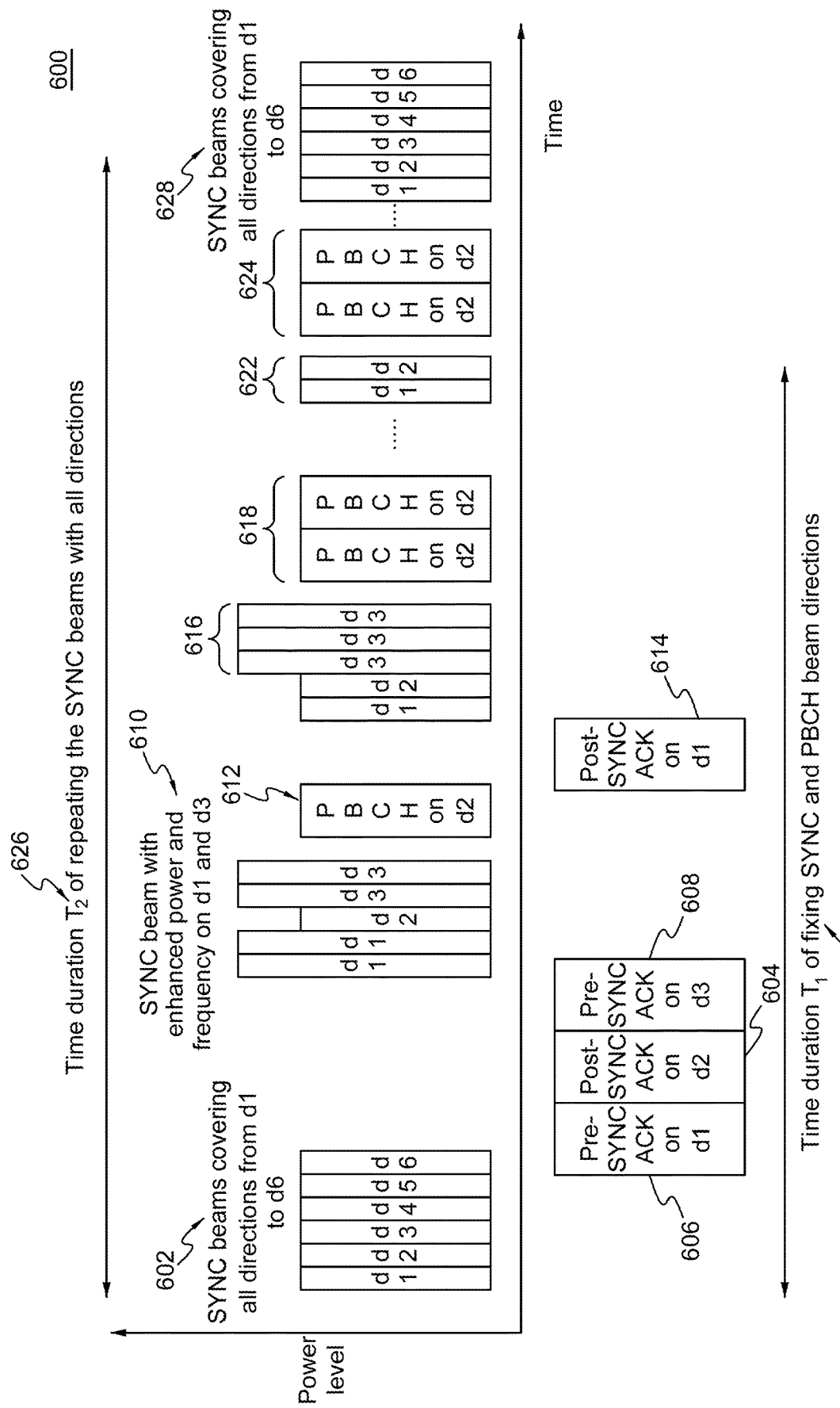
FIG. 6 is an illustration of a power saving mode determination procedure.

FIG. 6 is a diagram 600 of exemplary multiple beam based SYNC and PBCH signals. The example shown in FIG. 6 makes use of both a method where the WTRU sends an ACK when energy is detected above a predetermined threshold for particular beams and where the WTRU sends the ACK when it both detects the SYNC signal and finishes initial synchronization. For example, if two thresholds ($A_1 > A_2$) are used for the WTRU to detect the gNB SYNC signals, and a WTRU's auto-correlated SYNC signal is above the threshold $A_2$ but below the threshold $A_1$, then it may be considered to be partially synchronized. If the WTRU's auto-correlated SYNC signal is above the threshold $A_1$, then it may be considered to be fully synchronized. For partial synchronization, the WTRU may send a pre-synchronization ACK to the gNB. For full synchronization, the WTRU may send a post-synchronization ACK to the gNB. It may also be possible to use multiple levels of pre-synchronization ACKs, each corresponding to a different level of threshold below $A_1$. The multiple levels of pre-synchronization ACK may trigger different responses from the gNB.

If the gNB receives pre-synchronization ACKs for certain beam directions, the gNB may know that there are potential WTRUs in those beam directions that have not been fully synchronized. To facilitate synchronization of those WTRUs, the gNB may enhance SYNC signals transmitted towards those directions. The enhancement may be done in one or more ways. For example, the SYNC signal power may be enhanced towards those directions. For another example, the frequency of the SYNC signals may be enhanced toward those beam directions, for example, via multiple consecutive beams toward the same direction. Also, depending on the multiple levels of pre-synchronization ACK, the gNB may adjust the power or frequency of the following SYNC signals accordingly.

If the gNB receives a post-sync ACK for certain beam directions, the gNB may know that there are some WTRUs already synchronized on those beam directions. The gNB may then send the PBCH signals toward those directions to facilitate the WTRUs camping on those directions. If the gNB does not receive any pre-synchronization ACKs or post-synchronization ACKs from some beam directions, and it does not have any record showing that any of its camped WTRUs are currently in those directions, then it may stop the SYNC beams toward those directions. This stoppage may be for a limited time. For example, a hardware or software based timer may be used to control when to start SYNC beams back toward those directions. This may save the transmission power and SYNC channel resources of the gNB. The saved SYNC channel resources may be used for WTRUs in other beam directions.

Referring back to FIG. 6, a gNB may send the SYNC signals over multiple beams to cover all directions $(d_1, \ldots, d_6)$ 602. As used herein, the term SYNC signal may be replaced by a paging indication. A paging indication may be a short signal. In the example illustrated in FIG. 6, the gNB only receives the post-SYNC ACK 604 from some WTRUs for the direction $d_2$ and the pre-SYNC ACK 606, 608 from some WTRUs for the directions $d_1$ and $d_3$. It may then check its database to determine if there are any existing WTRUs in the other directions, for example, $d_4, \ldots, d_6$. If not, the gNB may update its SYNC signals, and, during the next sweep 610, the gNB may only send the SYNC covering directions $d_1$, $d_2$, $d_3$ The gNB may further enhance the SYNC beam signal strengths for directions $d_1$ and $d_3$ and send multiple duplicated SYNC beams toward directions $d_1$ and $d_3$. The gNB may also send the PBCH beam on direction $d_2$ 612. As used herein, the term PBCH may be substituted by a paging message. A paging message may be a long signal.

With this enhancement on the SYNC beams for direction $d_1$, the gNB may receive the post-SYNC ACK 614 from some WTRUs for the direction $d_1$. Further, in the illustrated example, the gNB has not received the post-SYNC ACK for the direction $d_3$. The gNB may then further enhance the SYNC beams 616 toward the direction $d_3$, and it may send the PBCH to both directions $d_1$ and $d_2$ 618.

If, after some time duration $T_1$ 620 from the SYNC beams covering all the directions, the gNB still has not received any post-SYNC ACK for the direction $d_3$, then it may stop the SYNC beam toward the direction $d_3$ and may maintain just the SYNC 622 and PBCH 624 beams for directions $d_1$ and $d_2$. After some time duration $T_2$ 626 from the SYNC beams covering all the directions, the gNB may again send 628 the SYNC beams in all the directions to cover any prospective newly arriving WTRUs.

Figure 7:
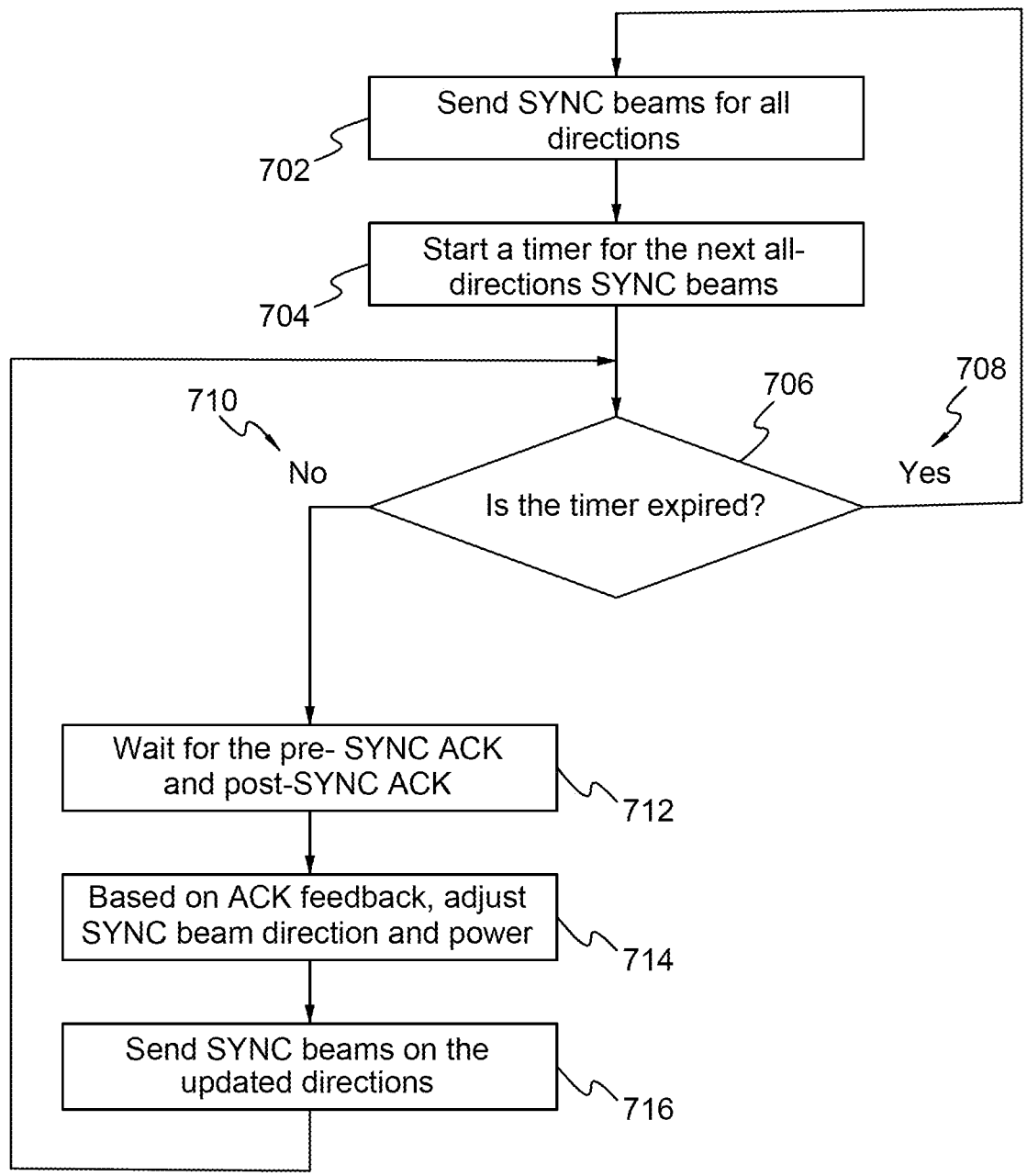
FIG. 7 is a flow diagram of an example next generation Node B (gNB) SYNC beam modification procedure.

FIG. 7 is a flow diagram 700 of an example gNB SYNC beam modification procedure. In the example illustrated in FIG. 7, the gNB sends the SYNC beams 702 to all directions and starts a timer $T_2$ 704 for the next SYNC beams to all directions. Before sending the next SYNC beams, the gNB may first check whether the timer $T_2$ has expired 706. If it has expired 708, then it may again send the SYNC beams 702 to all directions. If not 710, it may restrict the SYNC beam directions and powers. After the SYNC beams, the gNB may wait 712 for feedback from WTRUs. This may include the pre-SYNC ACK, which may include one or multiple levels, or the post-SYNC ACK. Based on the WTRU SYNC ACK feedback, the gNB may adjust 714 its SYNC beam directions and beam powers to serve WTRUs with different requirements. The gNB may then send the corresponding SYNC beams and its subsequent PBCH beams 716 with some restricted directions and/or powers (which may or may not be enhanced). After sending SYNC beams in updated direction, the gNB may check 706 the status of a timer.

It may occur that more than one WTRU detects a SYNC signal in the same beam. Two or more WTRUs may send ACKs to respond to that beam. A common or fixed resource for ACK across multiple WTRUs may be used. Since the gNB may not need to distinguish between WTRUs, a common resource may be sufficient. For example, this common resource may be common among beam, frequency, time or all three of these.

SYNC-ACK resources may use fixed resources, sequences or preambles. In the ACK-to-SYNC schemes described above, it was assumed that the WTRU could send the pre-synchronization ACK or post-synchronization ACK to the gNB for its adjustment following SYNC and PBCH beams. The ACK message may inform the gNB which beam directions have potential WTRUs. To enable the message passing from the WTRU to the gNB, some uplink resources may need to be reserved. Also, the gNB may be required to know its associated SYNC beam direction once it receives a SYNC ACK message. Several methods of allocating uplink resources for the SYNC ACK signals and different designs for the SYNC ACK signals are disclosed herein.

Figure 8:
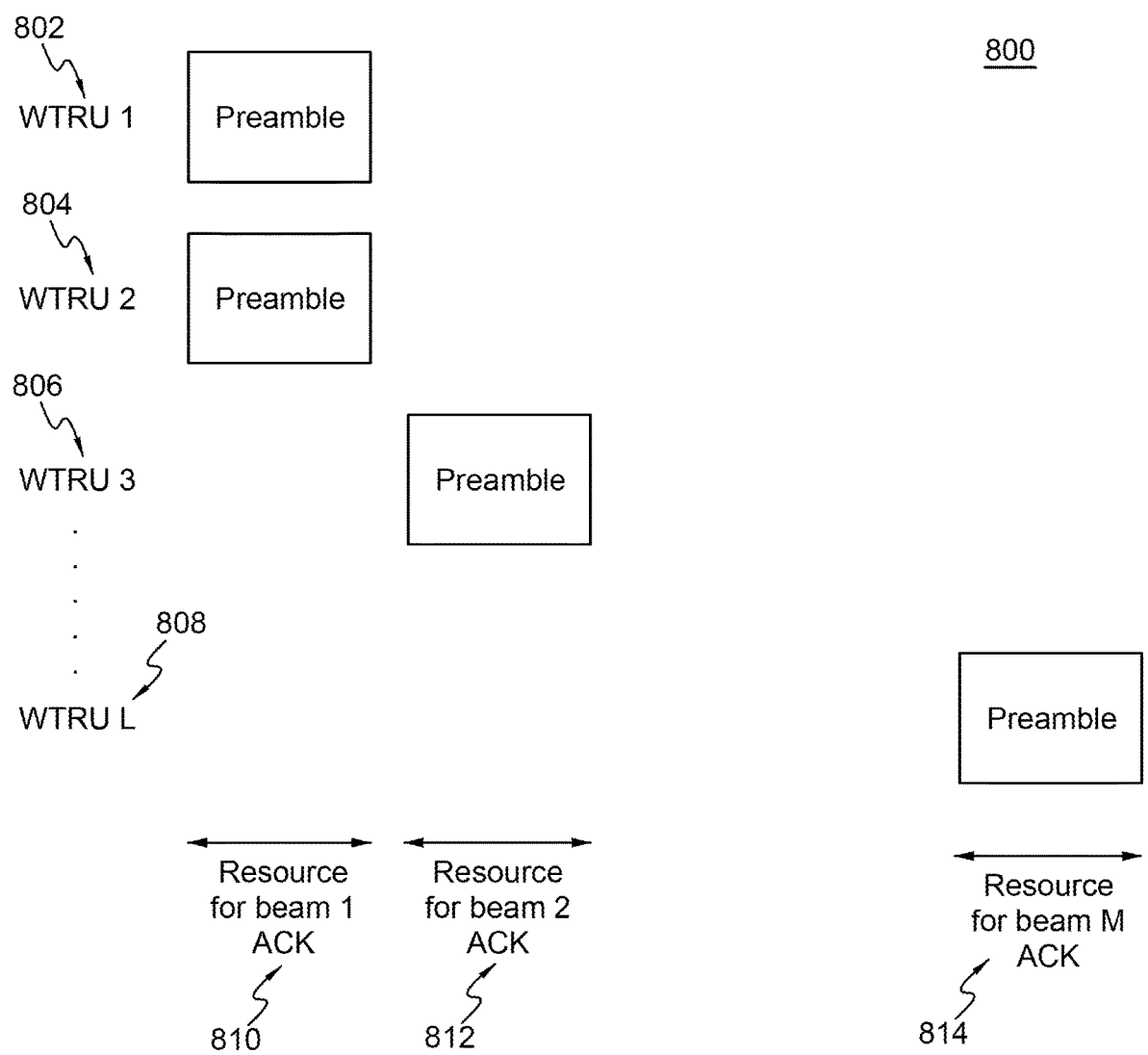
FIG. 8 is a diagram of an example of resource allocation based SYNC ACK.

FIG. 8 is a diagram 800 of an example of resource allocation based SYNC ACK. In the example illustrated in FIG. 8, uplink resources may be allocated for the SYNC ACK signals based purely on resource allocation. Specifically, the gNB may allocate dedicated resources for each SYNC beam direction. In the example illustrated in FIG. 8, the gNB may, for example, send the SYNC beams to directions $d_1, \ldots, d_M$. The gNB may then reserve M resource units in the time domain, the frequency domain, or some combination thereof. If a WTRU is able to detect the SYNC beam for the i-th direction $d_i$, the WTRU may send its SYNC-ACK signals in the i-th resource unit. In embodiments, multiple WTRUs within the same beam coverage directions may send their ACK signals simultaneously on the allocated resource unit. This may enhance the reception successive rate at the gNB side. In the example illustrated in FIG. 8, for example, the WTRU 1 802 and WTRU 2 804 are within the same SYNC beam coverage and send the SYNC ACK signals in the same resource 810. WTRU 3 806 is within a different SYNC beam coverage 812 from WTRU 1 802 and WTRU 2 804. Therefore, WTRU 3 sends a preamble at a second resource 812. In much the same way, for example, WTRU L 808 sends a preamble at resource M 814.

Figure 9:
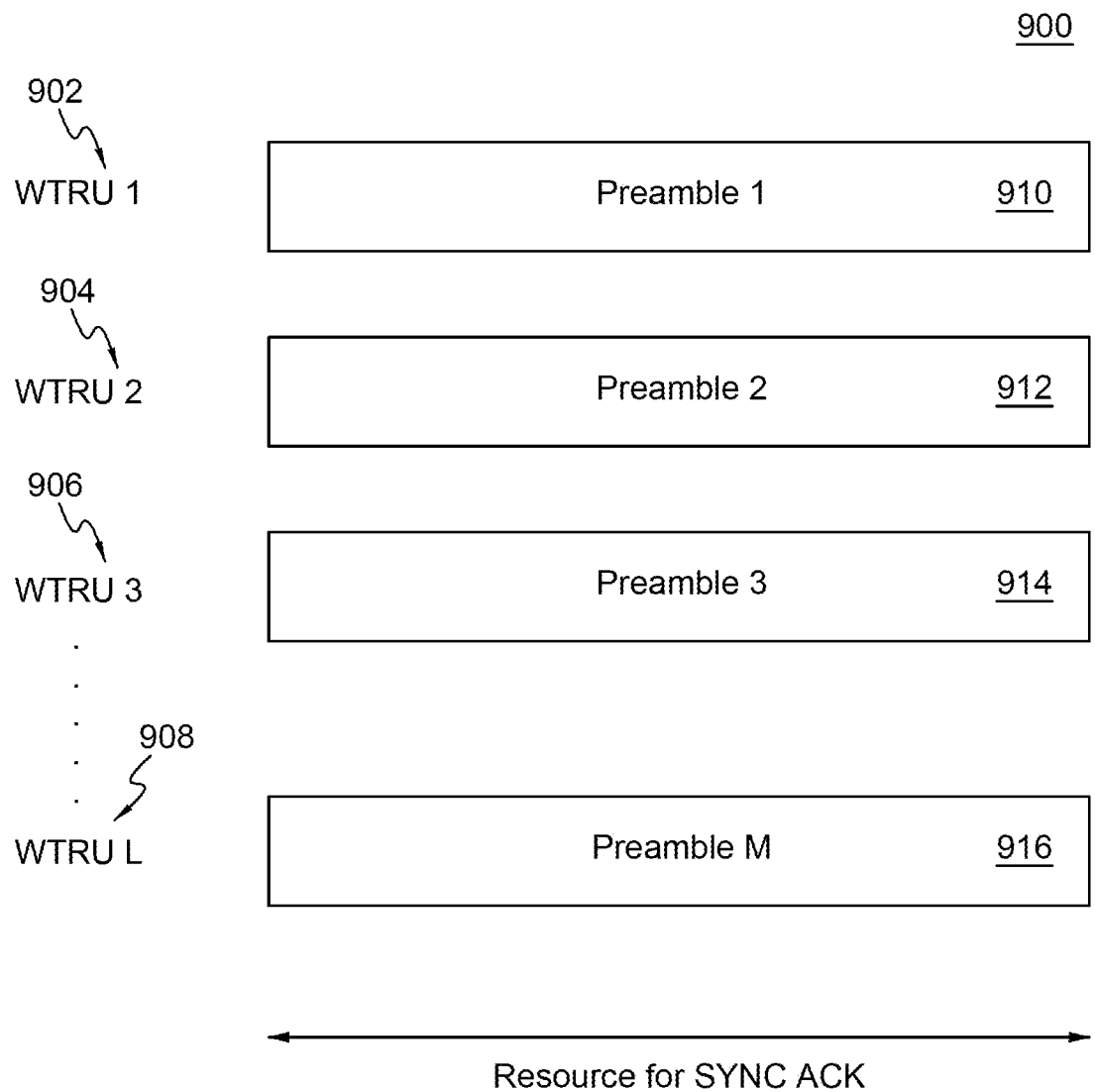
FIG. 9 is a diagram of an example of preamble based SYNC ACK.

FIG. 9 is a diagram 900 of an example of preamble based SYNC ACK, which may rely purely on the SYNC ACK signals. In the example illustrated in FIG. 9, multiple preambles may be used to indicate different beams directions. For example, the gNB may send beams to directions $d_1, \ldots, d_M$, and M preambles $p_1, \ldots, p_M$ may be reserved, each corresponding to a beam direction. If a WTRU is able to detect the SYNC beam for the i-th direction $d_i$, it may send its SYNC-ACK signal with preamble $p_i$. In one or more embodiments, a common uplink resource may be used to send SYNC-ACK signals. As described above, multiple WTRUs within the same beam coverage direction may send their SYNC-ACK signals with the same preamble. This may increase the probability that the gNB may detect the preamble. In the example illustrated in FIG. 9, WTRU 1 902 and WTRU2 904 are within the same beam coverage and send the SYNC-ACK signals with the same preamble 910, 912. WTRU 3 906 may be within a different beam coverage of WTRU1 902 and WTRU2 904 and therefore may send a different preamble 914. WTRU L 908 may be in an altogether different beam coverage and may send an altogether different preamble 916.

SYNC-ACK resources may use fixed resources, sequences or preambles. SYNC-ACK resources may also use fixed frequency/time resources, which may utilize regular time and/or frequency resources or an unused guard time or guard band.

In embodiments, the examples illustrated in both FIG. 8 and FIG. 9 may be implemented jointly. For example, both preamble and resource allocation may be used to indicate the SYNC beam direction.

Figure 10:
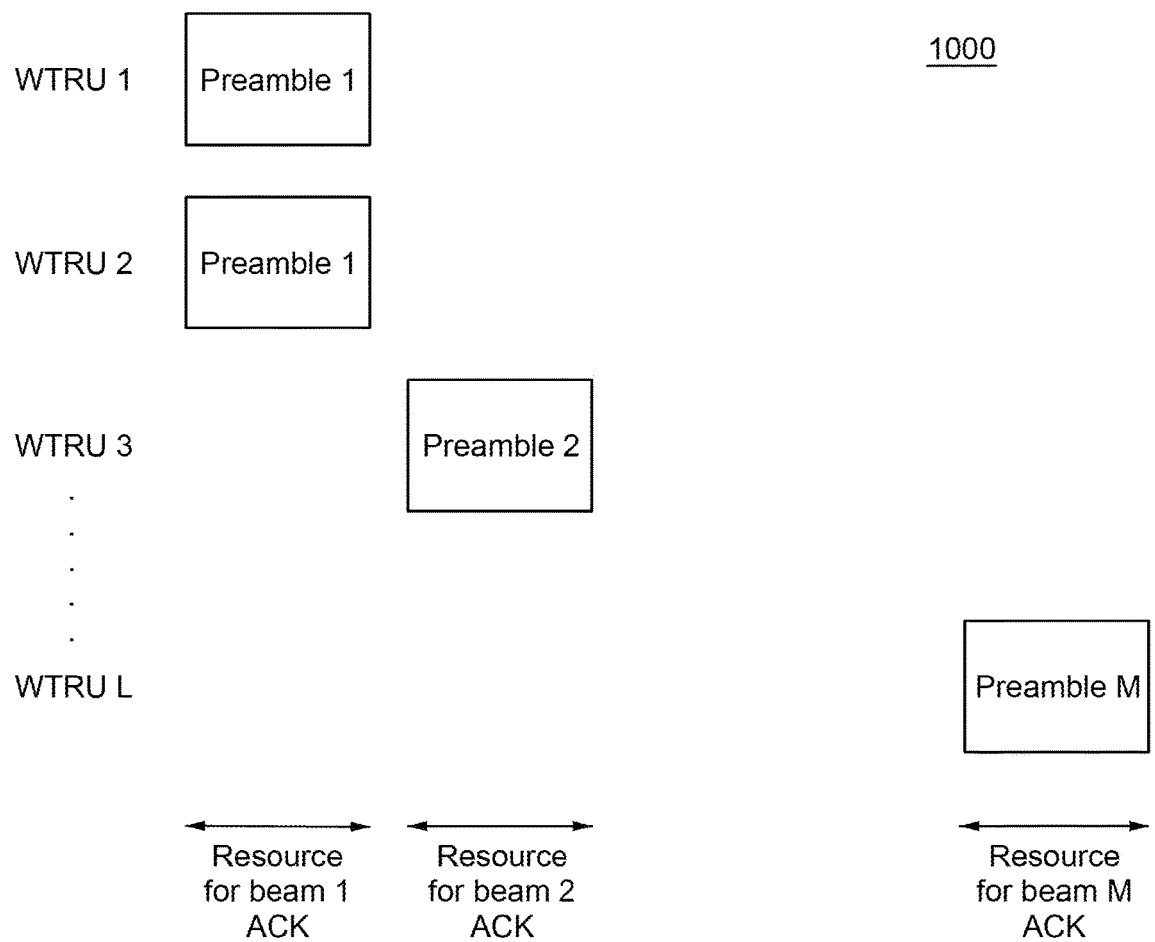
FIG. 10 is a diagram of an example resource allocation and preamble based SYNC ACK.

FIG. 10 is a diagram of an example resource allocation and preamble based SYNC ACK. In the example illustrated in FIG. 10, WTRU 1 and WTRU2 are within the same SYNC coverage and send the SYNC ACK signals in the same resource with the same preamble associated with this beam direction. WTRU 3 through WTRU L are shown as having a different resource allocation. In this way, each transmits different preamble using different beam resources.

Figure 11:
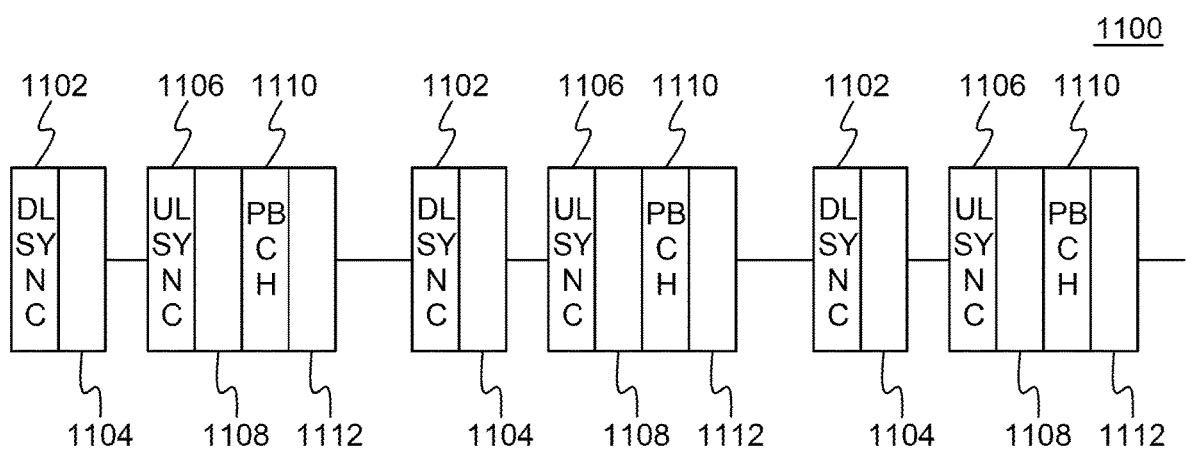
FIG. 11 is a diagram showing an example of the uplink (UL) SYNC being transmitted before the PBCH and after the downlink (DL) SYNC signal.
Figure 12:
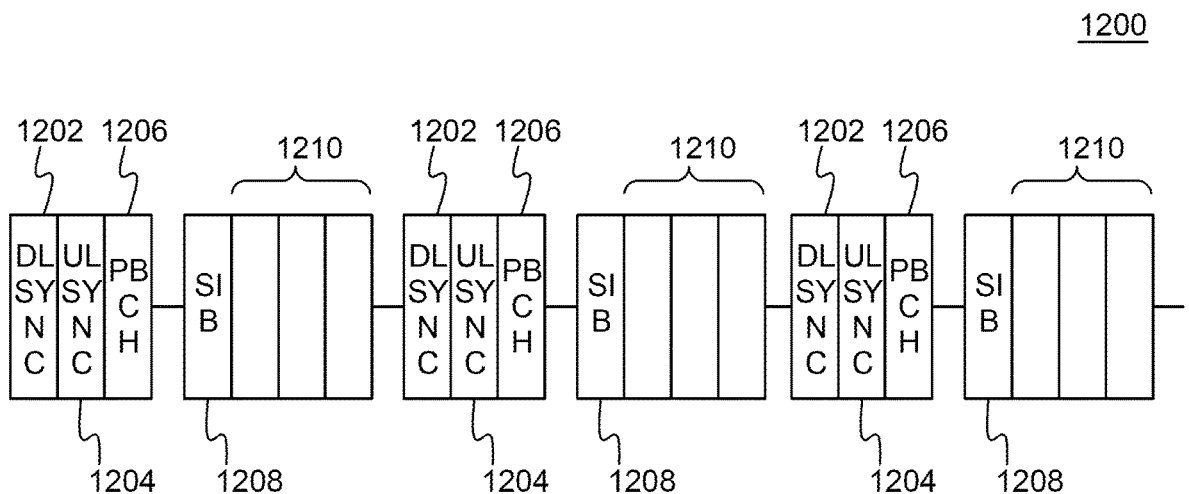
FIG. 12 is a diagram showing the UL SYNC being transmitted before the PBCH and after the DL SYNC signal.
Figure 13:
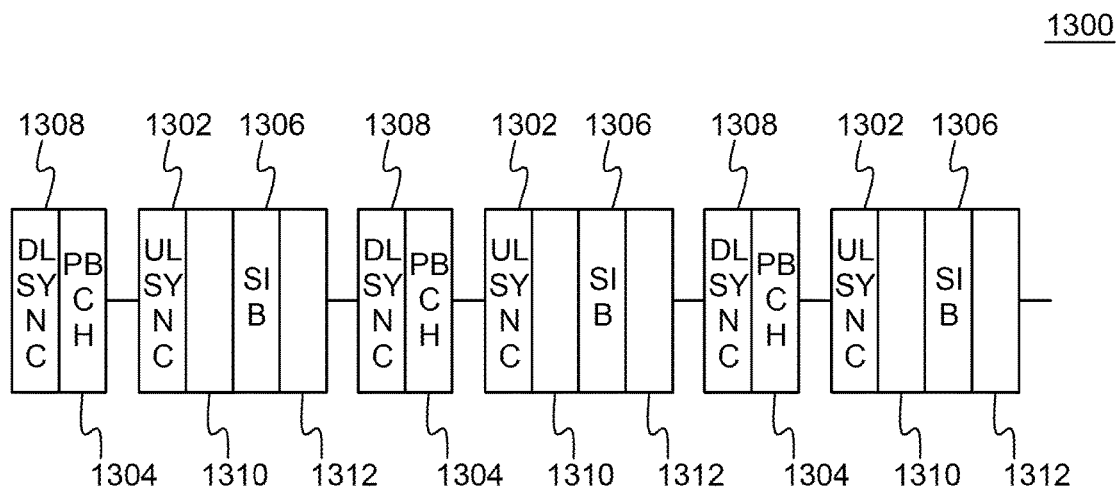
FIG. 13 is a diagram showing the UL SYNC being transmitted after the PBCH and before the system information block (SIB)

In embodiments, an uplink SYNC signal may be used in addition to the DL SYNC signal. The UL SYNC signal may be transmitted, for example, within a certain period of time, which may be the same as, or longer than, other channels, such as DL SYNC, PBCH or a system information block (SIB) transmission. FIGS. 11-13 illustrate various potential timing arrangements for the UL SYNC transmission. FIGS. 11 and 12 are diagrams showing different examples of the UL SYNC being transmitted before the PBCH (e.g., K2 time units (e.g., time symbols, OFDM symbols, or TTIs) before the PBCH) and after the DL SYNC (e.g., K1 time units (e.g., time symbols, OFDM symbols, or TTIs) after the DL SYNC).

For example, in the example 1100 shown in FIG. 11, a DL SYNC signal 1102 is transmitted at a delay 1104 prior to an UL SYNC signal 1106. After a second delay 1108, a PBCH signal 1110 may be transmitted. A third delay period 1112 may be provided before the pattern in repeated.

FIG. 12 is a diagram 1200 showing a DL SYNC signal 1202 being transmitted before a PBCH signal 1206 and before an UL SYNC signal 1204. Lastly a SIB may be transmitted 1208. This process may be repeated after a delay 1210 of some time period.

FIG. 13 is a diagram 1300 showing an UL SYNC signal 1302 being transmitted after the PBCH 1304 and before a SIB 1306. A DL SYNC signal 1308 may be transmitted before the PBCH 1304. A delay may be introduced before 1310 and after 1312 the SIB transmission 1306.

Figure 14:
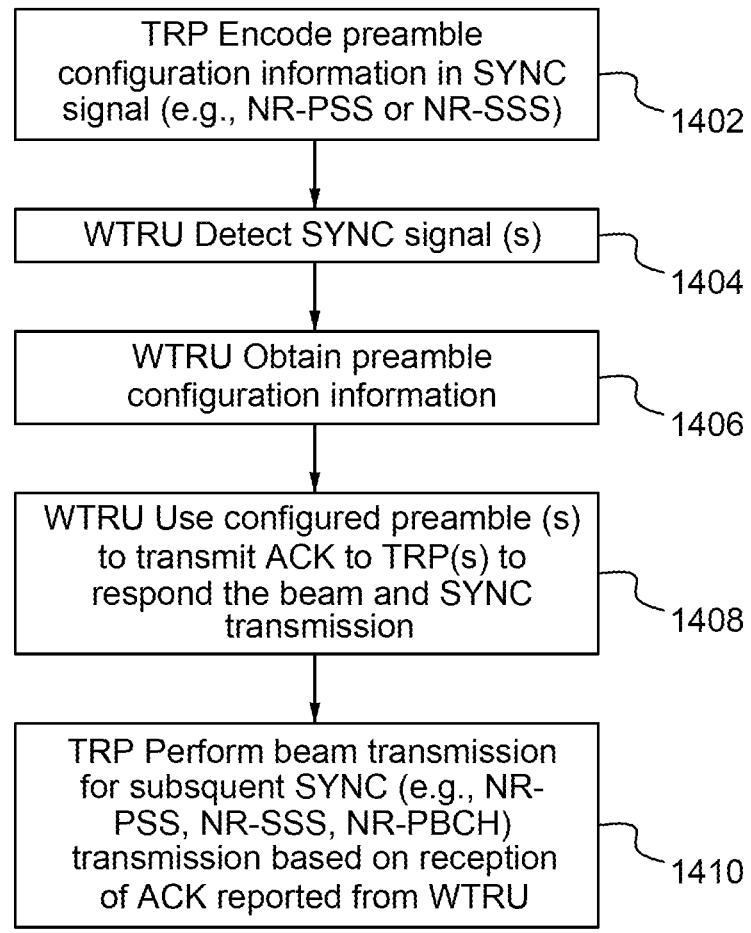
FIG. 14 is a flow diagram of an example method of efficient signal transmission with configured preamble for UL reporting.

FIG. 14 is a flow diagram 1400 of an example method of efficient signal transmission with configured preamble for UL reporting. In the example illustrated in FIG. 14, a TRP may encode preamble configuration information in a SYNC signal 1402, such as an NR-PSS or an NR-SSS. The WTRU may detect one or more SYNC signals 1404 and based on the detected one or more SYNC signals, the WTRU may obtain 1406 preamble configuration information or UL SYNC configuration information. The WTRU may use one or more configured preambles or UL SYNC configuration information to transmit an acknowledgement 1408 to one or more TRPs to respond to the beam and SYNC transmission. The TRP may perform beam transmission 1410 for subsequent SYNC (e.g., NR-PSS, NR-SSS, or NR-PBCH) transmission based on the reception of WTRU feedback, such as reception of a preamble, a UL SYNC signal or an acknowledgement reported from the WTRU.

LTE and LTE Advanced (LTE-A) define 504 different physical-layer cell identities. A set of physical-layer cell identities may be further divided into 168 cell-identity groups, with three cell identities within each group. In NR, beams may be considered orthogonal to each other when identified in a group within a sector, a cell, or both. For each cell identity, a PSS and an SSS may be defined. For the NR SYNC design, the PBCH and associated SYNC signal may be defined for every physical layer cell identity. For NR, a physical layer cell identity may be defined for a sector wherein a sector may be made up of a number of unique beams. There may also be multiple overlapping beams within a sector that provide coverage to the sector area. However, groups of beams may be considered orthogonal. There may be hundreds of beams that belong to a sector, which may be identified and/or associated with a unique cell ID. Each beam within a sector and/or cell should be able to be uniquely identified by the WTRU.

A PBCH may be defined for a single sector, cell, and/or beam, or it may be defined for multiple beams within a sector and/or cell. A unique NR SYNC signal may be associated with each of the possible previously defined PBCH instantiations and sectors.

To minimize the signaling overhead, and also provide a logical definition of the NR SYNC identifications, the NR SYNC signals and associated beams may use a hierarchical design. For example, a hierarchical beam identification may be defined for supporting a unique synchronization signal for each WTRU in a sector. The identification of a PSS SYNC signal may be simplified through a hierarchical blind search using a hierarchical beam identification design. An SSS SYNC identification may be derived from the PSS identification once that is found.

Figure 15:
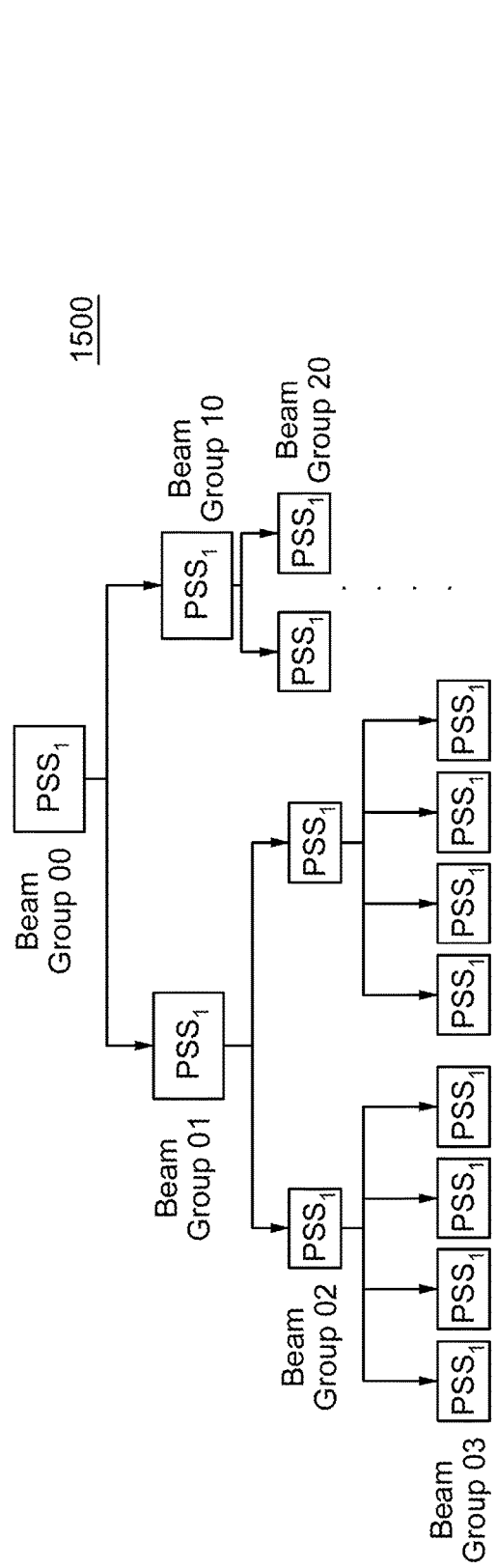
FIG. 15 is a diagram of an example hierarchical beam identification for a primary synchronization signal (PSS)

FIG. 15 is a diagram of an example hierarchical beam identification method 1500 which may be implemented using a PSS. In the example illustrated in FIG. 15, each leaf of the hierarchical tree may be associated with a beam group. A beam group may include one or more beams that are orthogonal to other beam groups in the hierarchy. In an example, a PSS may indicate a Beam Group 00, Beam Group 01, Beam Group 02 or Beam Group 03. Alternatively, a PSS may be used to indicate Beam Group 10 or Beam Group 20. In the example shown in FIG. 15, Beam Group 01 and Beam Group 10 may be orthogonal.

Figure 16:
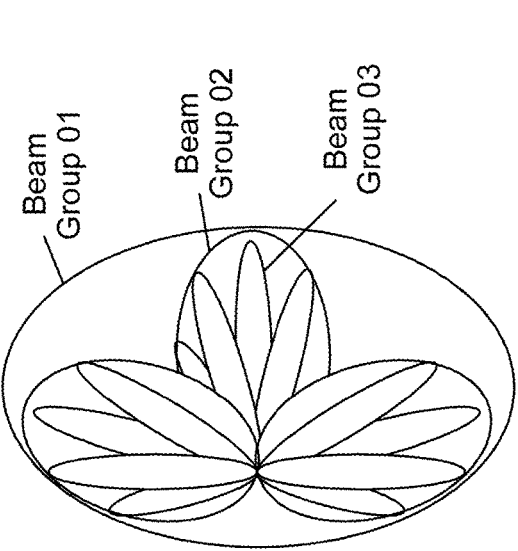
FIG. 16 is a diagram of a spatial visualization of the overlapping of beams within a group.

In another example, beams within a group may overlap and, consequently, may not be orthogonal. FIG. 16 is a diagram 1600 of a visualization of the overlapping of beams within a group. Using a beam group, the identification of the unique beam for a particular WTRU may be faster than without this organization and associated procedure. FIG. 16 shows three beam groups: Beam Group 01, Beam Group 02 and Beam Group 03. Beam Group 03 overlaps in space with Beam Group 02 and beam Group 02 overlaps in space with Beam Group 01.

FIG. 17A illustrates frequency division duplex (FDD) sub-frame timing 1700. FIG. 17B illustrates time domain duplex (TDD) sub-frame timing 1710. The sub-frame timing within a beam group may be determined from the PSS due to the time-domain position of the PSS in the frame. As an example, in FDD, the PSS may be transmitted within the last symbol of the first slot of subframes 0 and 5 and the associated SSS may be transmitted in the second to last symbol of the same slot. As another example, for time division duplex (TDD), the PSS may be transmitted within the third symbol of subframes 1 and 6 and the SSS may be transmitted in the last symbol of subframes 0 and 5. Other possibilities may depend on the frame structure of the transmission. By detecting a PSS in a beam group, the timing of the cell may be determined. A number of symbols per slot/subframe may vary depending on subcarrier spacing. For subcarrier spacing <=60, the number of OFDM symbols/slot may be either 7 or 14. For subcarrier spacing >60, the number of OFDM symbols/slot is 14.

Figure 18:
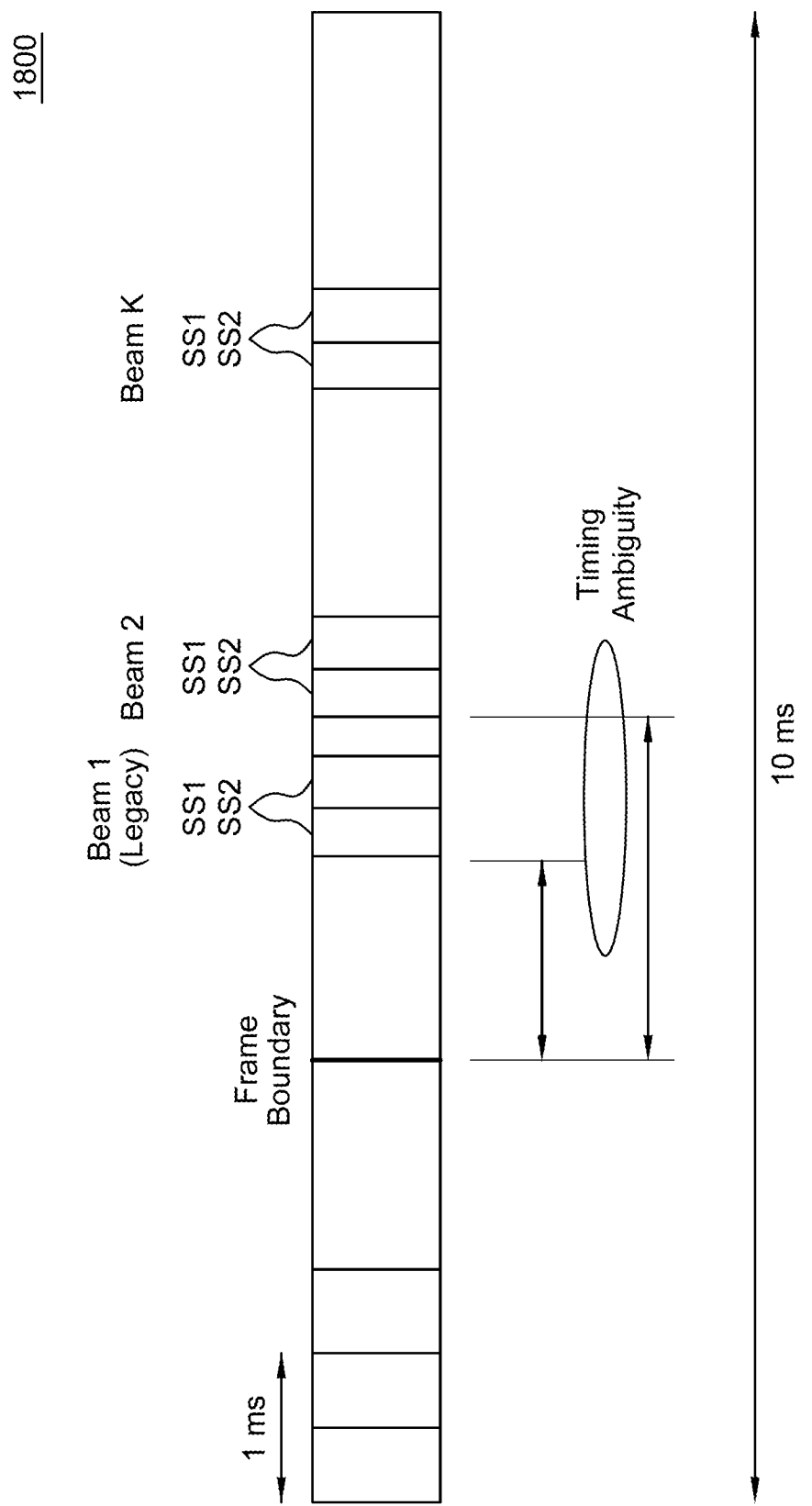
FIG. 18 is an illustration of a timing ambiguity that may exist between a first beam of a first SS signal and a second beam of a second SS signal.

FIG. 18 is an illustration of a potential timing ambiguity 1800 that may exist between a first beam of a first SS signal and a second beam of a second SS signal. Support for a multi-beam design in NR may lead to a problem with cell ID, beam ID, and subframe/frame boundary detection for multi-beam that does not exist in LTE. In particular, a timing ambiguity may be caused by multi-beam based synchronization procedures. For example, FIG. 18 shows a first (SS1) and second (SS2) being transmitted in a legacy single beam transmission. At some point in time after the first and second transmission, one or more additional beams may need to be transmitted in order to more accurately convey synchronization information to WTRUs. For example, a Beam 2 to Beam K transmission is shown in FIG. 18. The time period in which legacy Beam 1 and NR Beam 2 are transmitted may be ambiguous and may vary for different designs and/or different technologies. Some exemplary timing procedures are disclosed herein, these procedures aiming to close the gap with respect to this ambiguity.

Figure 19:
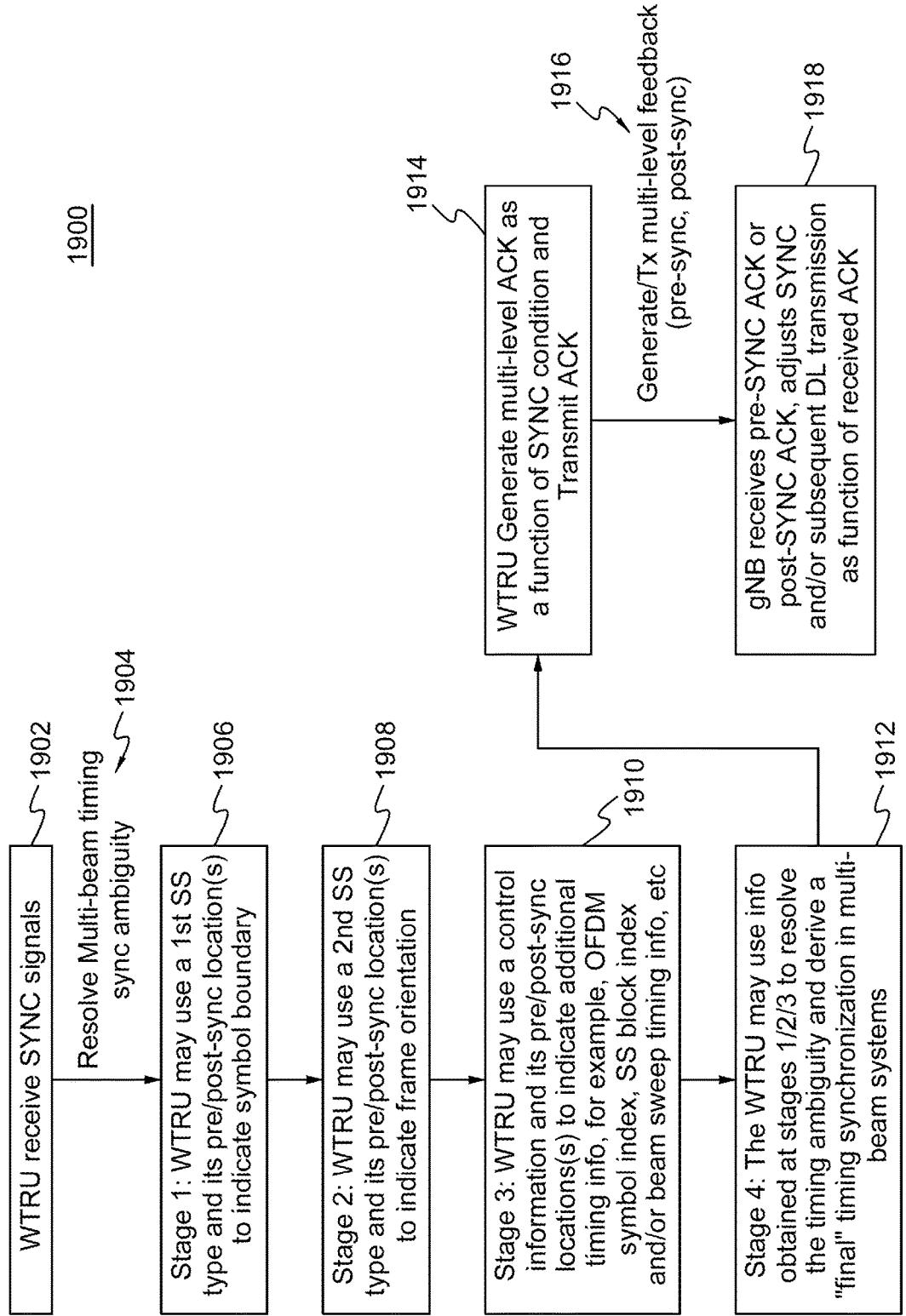
FIG. 19 is a flowchart for receiving SYNC signals by a WTRU and adjusting SYNC at a gNB.

FIG. 19 is a flowchart 1900 for receiving SYNC signals by a WTRU and adjusting SYNC at a gNB. A WTRU may receive one or more SYNC signals 1902 and may resolve multi-beam timing SYNC ambiguities 1904. In a first stage, the WTRU may use 1906 a 1st SS type and its pre/post-sync location(s) as an indication of a symbol boundary. In a second stage, the WTRU may use 1908 a $2^{nd}$ SS type and one or more corresponding pre/post-sync locations to indicate a frame orientation. In a third stage, for example a WTRU may use 1910 control information and pre/post SYNC locations as an indicator of additional timing info. This additional timing info may be, for example, an OFDM symbol index, an SS block index and/or a beam sweep timing. In a fourth stage, the WTRU may use 1912 information obtained at the first, second or third stage to resolve any timing ambiguities and derive a final timing synchronization for use in a multi beam system environment.

After resolving a final timing synchronization, the WTRU may generate 1914 a multi-level ACK as a function of the determined SYNC condition and transmit the ACK signal to a gNB. The ACK may comprise generated single or multi-level feedback 1916, for example pre-sync and post-sync information. When the gNB receives 1918 the pre-SYNC ACK or post SYNC ACK, the gNB may adjust SYNC and/or subsequent DL transmissions as a function of the information received in the ACK.

Figure 20:
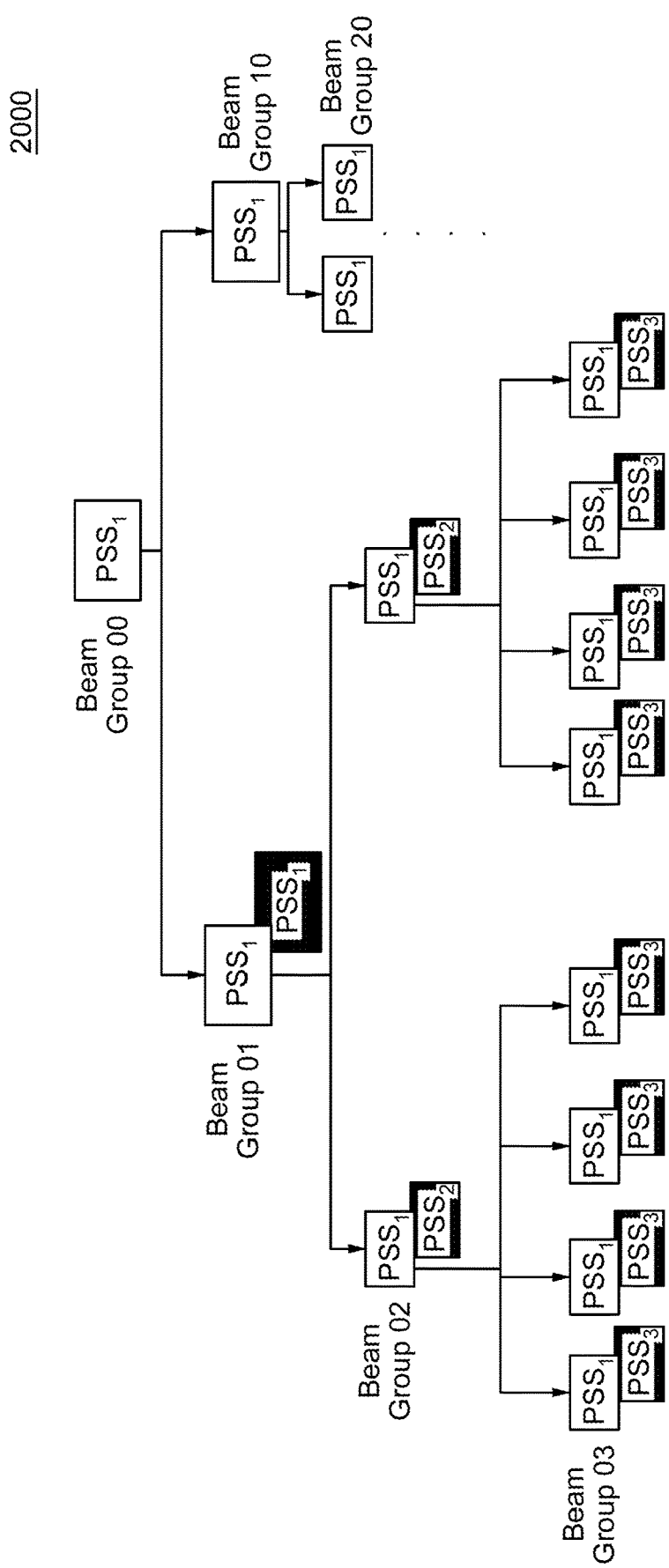
FIG. 20 is a diagram illustrating multiple PSS signals within a beam group.

FIG. 20 is a diagram 2000 illustrating multiple PSS signals within a beam group. For example, to further enable the identification of the NR SYNC beam, the beam group, and timing within the beam group, a second PSS signal may be included. The second PSS signal may have a different signature than the first PSS signal, and the second PSS signal may be associated with the beam group that the NR SYNC signals belongs to. As described above, the second PSS signal may also be placed in a different location within the frame and/or subframe to enable the simultaneous determination of the SYNC's timing. As shown in FIG. 20, a single PSS signal may be used to indicate Beam Group 00, Beam Group 01, Beam Group 10 or Beam Group 20. To provide information with respect to Beam Group 02, a first PSS may be used along with a different PSS signal (PSS2) may be used. For indicating information of Beam Group 03, a further different PSS signal (PSS3) may be used.

An SSS SYNC may be associated with each of the PSS SYNC signals defined for each beam group. From the SSS, the WTRU may determine the frame timing and cell identity group for any beam group from detection of any beam group.

The SYNC signals and the PBCH may be jointly designed in a synchronous fashion. For example, the gNB may change the order of the beam sweep. In order to support flexible network operation, it may be desirable to also have an asynchronous SYNC/PBCH design. A hybrid SYNC/PBCH design may also be considered.

Figure 21:
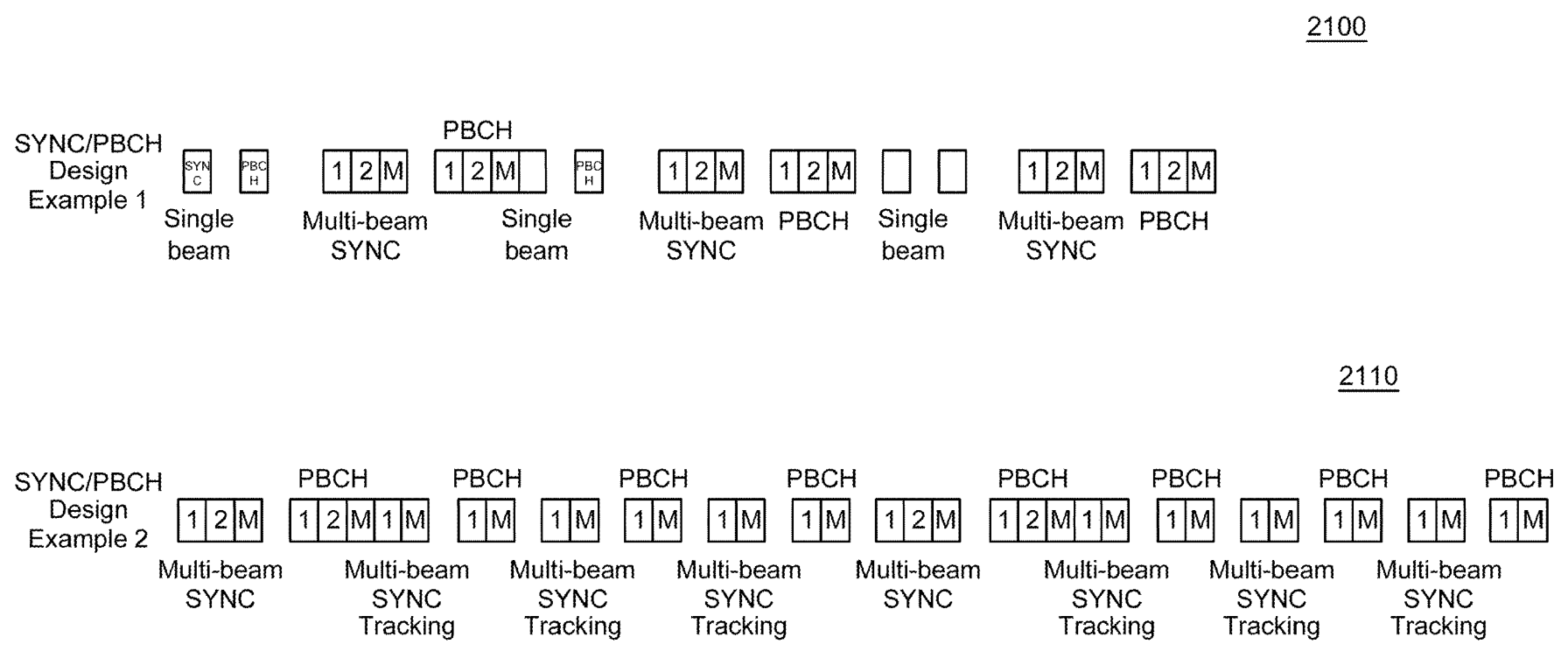

FIG. 21 is a diagram which illustrates two example synchronous SYNC/PBCH designs for single 2100 and multi-beam 2110 operation. In some embodiments, the SYNC signals and the PBCH may be jointly designed in a synchronous fashion such that the best SYNC DL beam for a given WTRU may also be the best PBCH DL beam for that given WTRU with high probability. The SYNC signals and PBCH may be jointly designed in a synchronous fashion in time, beam, frequency, or any combination thereof. When the WTRU detects a SYNC signal at beam #x in time index z, for example, the WTRU may be mapped to the time index w for the PBCH with high probability using, for example, two parameters. The first parameter may be the time offset between the SYNC and the PBCH and the second parameter may be the time beam index. The time offset may define T_offset_single, which may be the time offset between the SYNC and the PBCH for a single beam, and/or T_offset_multi, which may be the time offset between the SYNC and the PBCH for multi-beam. The time beam index may define a field, time_beam_index, as the time index for the SYNC beam and the PBCH beam with one to one mapping. For SYNC time_beam_index=1, 2 . . . , M, the corresponding PBCH time_beam_index=1, 2, . . . , M. An example is provided in FIG. 21. That is, when the WTRU detects SYNC DL beam #j, the WTRU may also detect PBCH DL beam #j, for j=1, 2, . . . M, respectively, with a very high probability. In the corresponding time index, the same beam may be used for SYNC and PBCH. This may aid in reducing latency, power consumption or both.

A synchronous SYNC/PBCH design may have the advantage of simplicity. It may also have the advantage of saving power by avoiding monitoring the PBCH in all directions of all beams. Synchronous SYNC/PBCH may enable beam discontinuous reception (DRX) of the WTRU during PBCH beam sweeping. That is, the WTRU may not need to wake up to monitor all of the PBCH beams. Instead, the WTRU may need to wake up and monitor the PBCH beams or beams that map to the SYNC beam or beams. Since it is time synchronous at beam level, no additional signaling may be required.

As shown in FIG. 21, for design example 1, a single beam SYNC and multi-beam SYNC are provided. Single beam SYNC is followed by single beam PBCH. Multi-beam SYNC is followed by multi-beam PBCH. The transmission may then revert back to single beam. Again, multi-beam SYNC is followed by multi-beam PBCH using the same beams as the multi-beam SYNC. This is followed again by a single beam transmission and another multi-beam SYNC and multi-beam PBCH.

For design example 2 of FIG. 21, only multi-beam transmissions are shown. A multi-beam SYNC is followed by PBCH transmission and multi-beam SYNC tracking in a synchronous fashion. After the first multi-beam SYNC tracking transmission, PBCH and multi-beam SYNC tracking are transmitted three times before another multi-beam SYNC transmission. This process then synchronously repeats itself.

Figure 22:
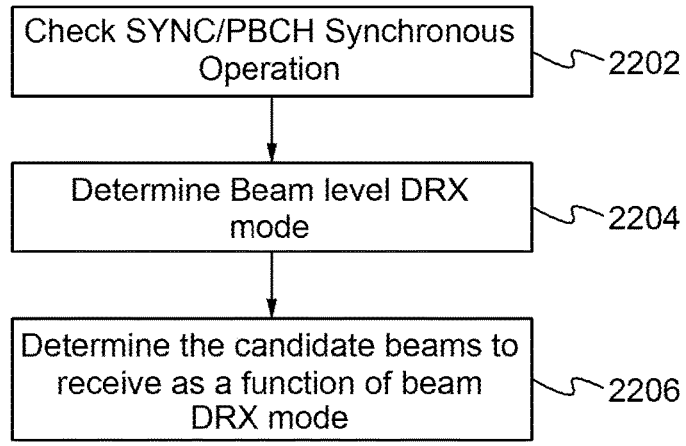
FIG. 22 is a flow diagram of an example of beam-level discontinuous reception (DRX) for synchronous SYNC/PBCH operations.

FIG. 22 is a flow diagram 2200 of an example of beam-level DRX for synchronous SYNC/PBCH operations. In the example illustrated in FIG. 22, a beam-level DRX is described. The WTRU may first check 2202 the SYNC/PBCH synchronous operation. The WTRU may then determine 2204 the beam-level DRX mode. For example, beam-level DRX may be activated for synchronous operation. Otherwise, regular DRX may be used. The WTRU may then determine 2206 the candidate beams to receive as a function of the DRX mode. For example, the WTRU may determine to receive only one beam or a small subset of beams for beam-level DRX mode or the WTRU may determine to receive a large subset of beams or all beams for regular DRX mode.

Figure 23:
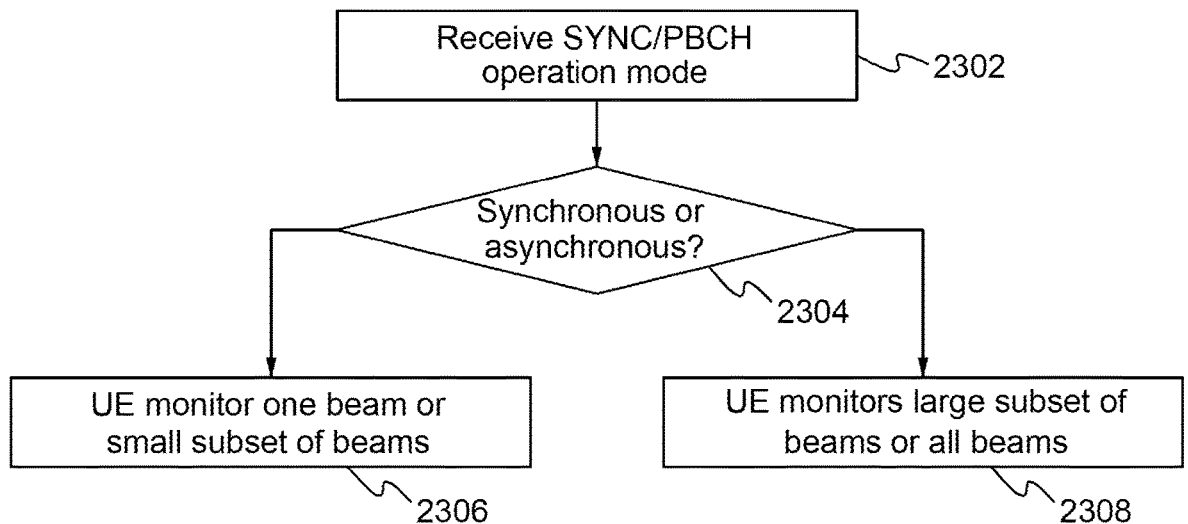
FIG. 23 is a flow diagram of example synchronous and asynchronous SYNC/PBCH operations.

FIG. 23 is a flow diagram 2300 of examplary synchronous and asynchronous SYNC/PBCH operations. For example, the eNB may change the beam sweeping operation by using different beams or different modes of beams. For example, the gNB may use a wide beam for the SYNC signals and use a narrow beam for the PBCH. Furthermore, the gNB may change the order of beam sweep or may skip some of the beams during the beam sweep. In order to support a flexible network operation, in one embodiment, an asynchronous SYNC/PBCH design may be used.

In an example asynchronous SYNC/PBCH design, the SYNC signals and the PBCH may no longer be synchronous in time, frequency or at a beam level. That is, detecting the SYNC beam may bear no information about the desired beam for the PBCH. Therefore, in an asynchronous SYNC/PBCH mode, the WTRU may need to search all downlink beam directions for the PBCH in order to receive and detect the PBCH signal. A full multi-beam PBCH beam sweeping may be required. This may increase the power consumption of the WTRU since the WTRU may need to keep searching all PBCH beams in all directions. On the other hand, an asynchronous mode may provide for a more flexible network operation when the gNB may need to or wants to change beam operation to adapt to network traffic, manage interference or increase coverage, for example.

FIG. 23 illustrates a mode determination procedure performed by a WTRU. An asynchronous SYNC/PBCH design may require additional signaling, which may be used to inform the WTRU about beam sweeping strategies that may be considered at the WTRU. When the WTRU receives such information 2302, the WTRU may perform either synchronous SYNC/PBCH beam sweeping or asynchronous SYNC/PBCH beam sweeping accordingly. For example, when the WTRU detects an indicator of a synchronous SYNC/PBCH mode 2304, the WTRU may only need to monitor the corresponding downlink beam or a small subset 2306 of beams for the PBCH according to the mapped SYNC DL beam or beams. When the WTRU detects an indicator that indicates asynchronous SYNC/PBCH mode 2304, the WTRU may need to monitor a large subset 2308 of beams or all the beams in all directions for the PBCH signal regardless the detected SYNC beam or beams.

In some embodiments, in order to track beams, a partial synchronous SYNC/PBCH mode may be used. In a partial synchronous SYNC/PBCH operation, the WTRU may infer the PBCH beam or beams based on the detected SYNC beam. That is, there may be no exact one-to-one mapping between the SYNC beam and the PBCH beam. Instead, there may be one-to-many mappings from the SYNC beam to the PBCH beam or beams. For example, when the WTRU detects a SYNC beam, it may monitor not only the PBCH beam mapped to the detected SYNC beam but may also monitor the left and right beam for the PBCH based on the detected SYNC beam.

The exact one-to-many beam mappings from the SYNC to the PBCH beams may be defined beyond center, left and right beams. A beam subset for partial synchronous SYNC/PBCH beam operation may be specified. For example, a partial synchronous SYNC/PBCH beam operation may also include the left beam and the right beam in addition to left, right and center beams. Although adjacent beams for such beam subset may be reasonable, nonadjacent beam subsets may also be used for a partial synchronous SYNC/PBCH operation due to many factors, such as propagation environment changes, blockage, WTRU rotation, and WTRU movement.

In embodiments, SYNC/PBCH mode switching may occur. Autonomous SYNC/PBCH mode switching may also be caused by the fact that the gNB may change the beam, beamwidth and/or beam sweep order, for example. Different types of mode switching may be used, such as using an indication to indicate which mode should be used for the PBCH, which may be carried by the SYNC signal, or autonomous mode switching.

In embodiments, synchronous, asynchronous or hybrid SYNC/PBCH operations may be indicated to the WTRU. The WTRU may also perform autonomous mode switching for SYNC/PBCH operations. WTRU procedures for synchronous, asynchronous and hybrid SYNC/PBCH operations for Single/Multi-Beam may be performed accordingly. The WTRU may trigger a multi-stage processing based on the received indication. The gNB may indicate the partial synchronous or asynchronous SYNC/PBCH mode to the WTRU to inform the WTRU of such change. The gNB may use SYNC parameters for the indication and/or may insert a small payload, for example, a few bits, attached to a SYNC signal for the indication.

On the other hand, the WTRU may also deal with this unexpected situation using autonomous switching of modes. This switch may be temporary and WTRU-specific. Because of this, the switch may not affect other WTRUs that are still in synchronous SYNC/PBCH mode. When the PBCH is detected, the WTRU may switch back to the original synchronous mode for power saving if the WTRU needs to continue monitoring the SYNC and PBCH.

When the WTRU operates in a synchronous SYNC/PBCH mode, it may autonomously switch to the hybrid SYNC/PBCH mode or the asynchronous SYNC/PBCH mode. When the WTRU uses the detected SYNC beam to receive the PBCH beam and does not successfully detect the PBCH, the WTRU may choose to continue using the detected SYNC beam for PBCH detection by accumulating more symbols or samples for either coherent or non-coherent detection of the PBCH. Since the PBCH may repeat several times, for example, four times within 40 ms in LTE, a coherent detection may be possible by combining the collected symbols or samples. The WTRU may also immediately switch to asynchronous or hybrid synchronous SYNC/PBCH modes, by extending the candidate DL beams to receive the PBCH. The WTRU may measure the signal strength or signal-to-noise ratio (SNR) from a reference signal (RS), such as the common reference signal (CRS) or beam reference signal (BRS), to decide whether the current beam determined by synchronous SYNC/PBCH mode is the right beam to continue to use. This may be done by comparing the measured SNR or signal strength with a predetermined threshold.

Autonomous SYNC/PBCH mode switching may occur for several reasons, such as propagation environment changes, blockage, WTRU rotation, and WTRU movement. Autonomous SYNC/PBCH mode switching may also be due to the fact that the gNB may change the beam, beamwidth, or beam sweep order.

The SYNC signal may be used to provide random access information, such as the PRACH resources. The SYNC signal may be associated with the PRACH resources in time, beam, frequency and/or code. The RACH information may be split into two or multiple parts, such as basic information and extended information. Different SYNC sequences may be used to indicate different parts of RACH information. Different parts of RACH information may be transmitted using a combination of SYNC and PBCH. Alternatively, different parts of RACH information may be transmitted using a combination of SYNC, PBCH and SIB. A very small payload may be also attached to the SYNC signal either in an FDM, TDM or CDM fashion to indicate different parts of the random access information.

A gNB may be responsible for paging a WTRU when new data is available for transmission to the WTRU at the RAN. A paging message may be of a fixed size or may be of variable size. A paging procedure may be performed in accordance with any of the features and elements described above with respect to SYNC. In one embodiment, paging may be implemented as a multi-beam operation and may include a beam sweeping procedure. When a WTRU is in an idle mode, a paging channel may be used for sending a paging message. This paging message may be scheduled via a NR physical downlink control channel (NR-PDCCH) or other channel. Alternatively, the paging message may be unscheduled or an indication of the page may be part of another downlink message to the WTRU. The paging message may be included in an NR physical downlink shared channel (NR-PDSCH). In order to reduce signal overhead and latency due to beam sweeping, a "short" paging indication may be used before "long" paging message transmission. A short paging indication may be transmitted in all beams in all directions to obtain beam location profile of WTRUs. A long paging message may be transmitted in a subset of beams based on the obtained beam location profile of WTRUs. Since the short paging indication, as opposed to the long paging message, may be transmitted in all beams of all directions, or a relatively larger number of beams, followed by a long paging message transmitted in a subset of beams of certain small directions, or a relatively smaller number of beams. Accordingly, the paging overhead may be reduced in a beam sweeping processes. That is, a paging procedure may be performed in accordance with the features and elements described above with respect to SYNC and/or PBCH. Paging indication is used to assist paging message transmission, similar to SYNC used to assisted PBCH transmission for signal overhead reduction during beam sweeping in a multi-beam system. Paging indication may be a NR-PDCCH (short) and paging message may be a NR-PDSCH (long). The terms short and long may refer to payload size. In one embodiment paging may be initiated by a core network. In another embodiment, paging may be initiated by the RAN. A WTRU in discontinuous reception (DRX) mode may monitor a channel at a paging occasion.

In an initial state a gNB may transmit a message which spans all directions. This message may be low power and therefore may provide low interference with respect to other signals of the same or other eNB. The eNB may acquire WTRU feedback, for example, using an approach disclosed in FIGS. 11-13 or any other disclosed FIG. for that matter. Feedback may be beamforming feedback included in an ACK message. After receiving feedback, the gNB may transmit the paging message as a single direction transmission. Alternatively, the transmitted direction may be more than a single direction but less than all directions of the first message.

In one embodiment, a gNB may consider a frequency with which a WTRU is using. In this way, for low frequency LTE frequencies where beamformed transmissions may be less important, the gNB may transmit the paging message as a multi-directional message. For higher frequencies, for example mmW frequencies, the gNB may instead use a more limited and beamformed approach.

Paging transmission and SYNC transmission may not be completely separate. In one embodiment, paging and SYNC may be combined in such a way that a paging message and SYNC signals are combined or multiplexed together. It may be possible that the beam sweeping procedure for SYNC is combined with the beam sweeping procedure for paging. Alternatively, it may be possible that the beam sweeping procedure for SYNC is separate from the beam sweeping procedure for paging. If the beam sweeping procedures are distinct, the beam sweeping procedures may be performed differently. Beam sweeping for paging may be periodic.

In some embodiments, there may be distinctions between paging message transmissions and respective beam sweeping procedures. For example, for an incoming call, low latency paging may be time critical and therefore the paging message may need to be sent with limited delay. For example, for an email or message which is not time critical, it may be beneficial to employ a more time consuming beam sweeping procedure. This decision making approach to beam sweeping may be performed based on a data quality of service.

In both paging and SYNC embodiments, an ACK transmission which includes a preferred beam of the WTRU may be transmitted or offloaded over an unlicensed access network. Alternatively, the access network may be licensed, but may be distinct or different from the RAN used to transmit the initial SYNC message. This ACK transmission may be transmitted via LTE-WLAN Aggregation (LWA) or via an LTE WLAN radio Level Integration with IPsec Tunnel (LWIP).

A SYNC transmission from the gNB to the WTRU may be made in accordance with a DRX cycle of the WTRU. In this way, when the WTRU wakes up from DRX, it may receive and process the SYNC. A WTRU-ID may be an index to a period for which the WTRU listens for SYNC transmissions. In one embodiment, a SYNC and paging message may be received in a same DRX cycle.

It may additionally be beneficial to provide a multicast paging or other message to a plurality of WTRUs. In this embodiment, a gNB may transmit a SYNC to a plurality of WTRUs and receive one or more ACK messages in response. A paging or other message may then be transmitted in a multicast fashion to the plurality of WTRUs who transmitted an ACK. The WTRU may be a low cost WTRU, for example, a water meter or other meter.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method performed by a wireless transmit/receive unit (WTRU), the method comprising:
    receiving, by the WTRU from a base station (BS), a plurality of synchronization signals transmitted using multiple beams of the BS;
    comparing a received energy of each beam received by the WTRU of the multiple beams against a first threshold to identify a subset of the multiple beams of the BS;
    comparing an accumulated received energy of each beam of the subset against a second threshold;
    determining, from the plurality of synchronization signals, control information of the BS, wherein the control information comprises timing information including an orthogonal frequency division multiplexing (OFDM) symbol index, a synchronization signal block index or beam sweep timing information; and
    receiving data, from the BS, on a beam of subset in accordance with the determined control information.

2. The method of claim 1, further comprising:
    configuring the WTRU to operate and communicate in a wireless environment in accordance with the determined control information; and
    transmitting a report to the BS, the report indicating that the WTRU has completed synchronization to the BS.

3. The method of claim 2, further comprising:
    receiving, by the WTRU from the BS, a paging message, wherein the paging message is transmitted on beams which are a subset of the multiple beams of the BS.

4. The method of claim 1, wherein the plurality of synchronization signals includes a primary synchronization signal and a secondary synchronization signal.

5. The method of claim 1, further comprising:
    receiving, by the WTRU from the BS, a physical broadcast channel (PBCH) signal, wherein the PBCH signal is received on a subset of the multiple beams of the BS.

6. The method of claim 1, further comprising:
    determining a best beam of the subset.

7. The method of claim 6, further comprising:
    transmitting, to the BS, an indication of the determined best beam.

8. The method of claim 1, wherein the control information includes beam sweep timing information.

9. The method of claim 1, wherein the comparing is performed based on a signal-to-noise ratio (SNR).

10. The method of claim 1, wherein the synchronization signals include a PBCH signal.

11. A wireless transmit/receive unit (WTRU) comprising:
    a receiver configured to receive, from a base station (BS), a plurality of synchronization signals transmitted using multiple beams of the BS;
    circuitry configured to compare a received energy of each beam received by the WTRU of the multiple beams against a first threshold to identify a subset of the multiple beams of the BS;
    the circuitry further configured to compare an accumulated received energy of each beam of the subset against a second threshold;
    the circuitry further configured to determine, from the plurality of synchronization signals, control information of the BS, wherein the control information comprises timing information including an orthogonal frequency division multiplexing (OFDM) symbol index, a synchronization signal block index or beam sweep timing information; and
    a receiver configured to receive data, from the BS, on a beam of the subset in accordance with the determined control information.

12. The WTRU of claim 11, wherein the circuitry is configured to determine a best beam of the subset.

13. The WTRU of claim 12, further comprising:
    a transmitter configured to transmit an indication of the best beam to the BS.

14. The WTRU of claim 11, wherein the control information is determined based on one or more beams of the plurality of beams subset.

15. The WTRU of claim 11, wherein the control information includes beam sweep timing information.

16. The WTRU of claim 11, wherein the comparison is performed based on a signal-to-noise ratio (SNR).

17. The WTRU of claim 11, wherein the synchronization signals include a PBCH signal.

* * * * *